United States Patent
Sievert et al.

(10) Patent No.: US 6,687,729 B1
(45) Date of Patent: Feb. 3, 2004

(54) SYSTEM AND METHOD FOR PROVIDING A POOL OF REUSABLE THREADS FOR PERFORMING QUEUED ITEMS OF WORK

(75) Inventors: James A. Sievert, Lino Lakes, MN (US); Mark K. Vallevand, Lino Lakes, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/468,493

(22) Filed: Dec. 20, 1999

(51) Int. Cl.[7] .................................................. G06F 9/00
(52) U.S. Cl. ........................ 709/102; 709/105; 709/100
(58) Field of Search ................................ 709/100–102, 709/105

(56) References Cited

U.S. PATENT DOCUMENTS

| | | | | |
|---|---|---|---|---|
| 5,392,443 A | * | 2/1995 | Sakakibara et al. | 708/520 |
| 5,542,058 A | * | 7/1996 | Brown et al. | 712/23 |
| 5,632,032 A | * | 5/1997 | Ault et al. | 709/100 |
| 5,752,031 A | * | 5/1998 | Cutler et al. | 709/103 |
| 5,812,811 A | * | 9/1998 | Dubey et al. | 709/106 |
| 5,835,763 A | * | 11/1998 | Klein | 709/101 |
| 6,085,215 A | * | 7/2000 | Ramakrishnan et al. | 709/102 |
| 6,085,217 A | * | 7/2000 | Ault et al. | 709/100 |
| 6,418,458 B1 | * | 7/2002 | Maresco | 709/103 |

* cited by examiner

Primary Examiner—Bunjob Jaroenchonwanit
Assistant Examiner—Joseph E Avellino
(74) Attorney, Agent, or Firm—Charles A. Johnson; Mark T. Starr; Crawford Maunu PLLC

(57) ABSTRACT

A system and method for managing a pool of threads for executing thread operations. A thread pool is instantiated which includes a plurality of threads, and a work queue having program controllable states is instantiated. Thread operations are queued to the work queue when the work queue is in a running or suspended state, and when the work queue is in a stopped state requests to queue thread operations are denied. The work queue supports controlled allocation of thread resources to a variety of thread operations.

11 Claims, 12 Drawing Sheets

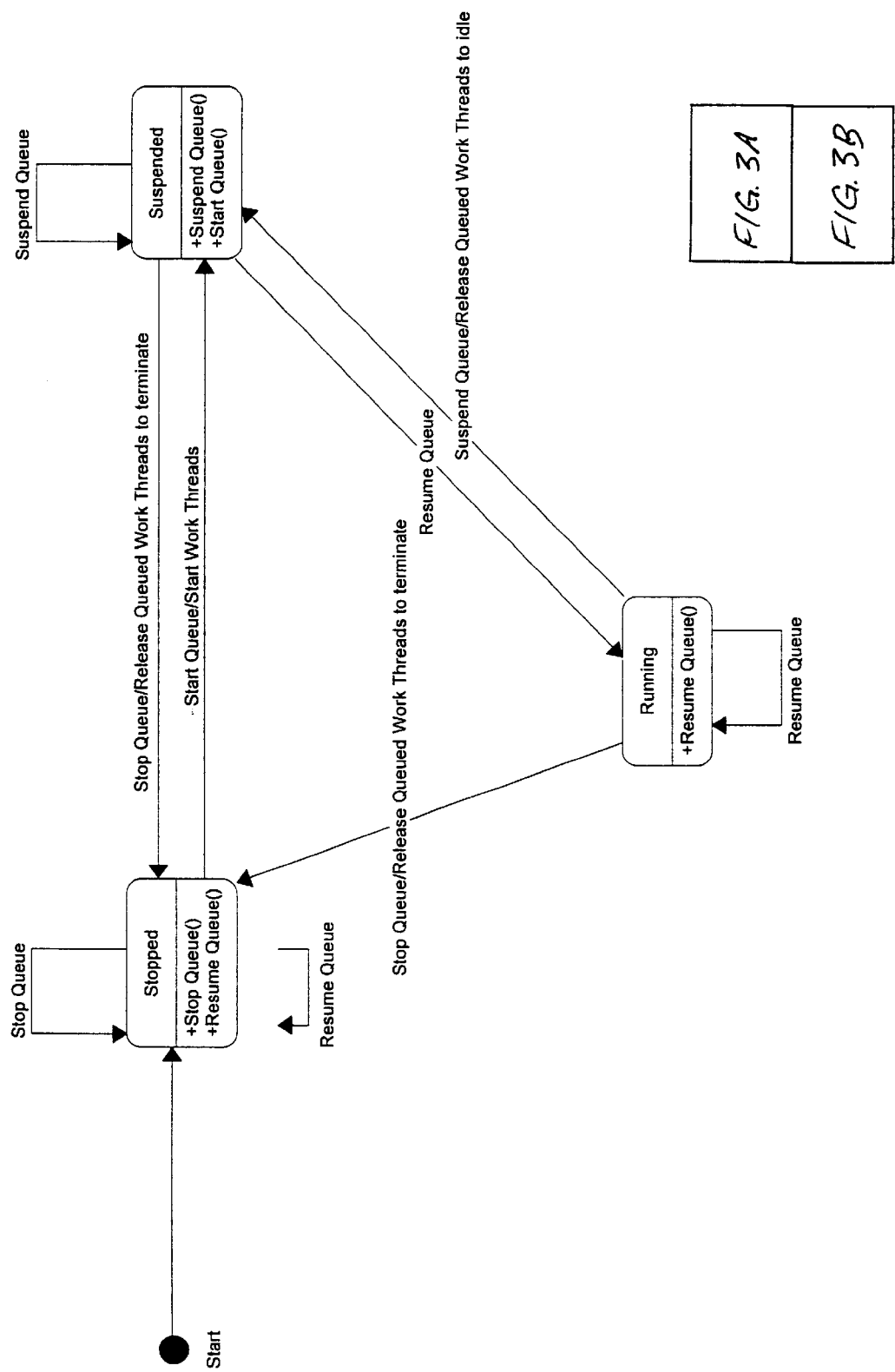

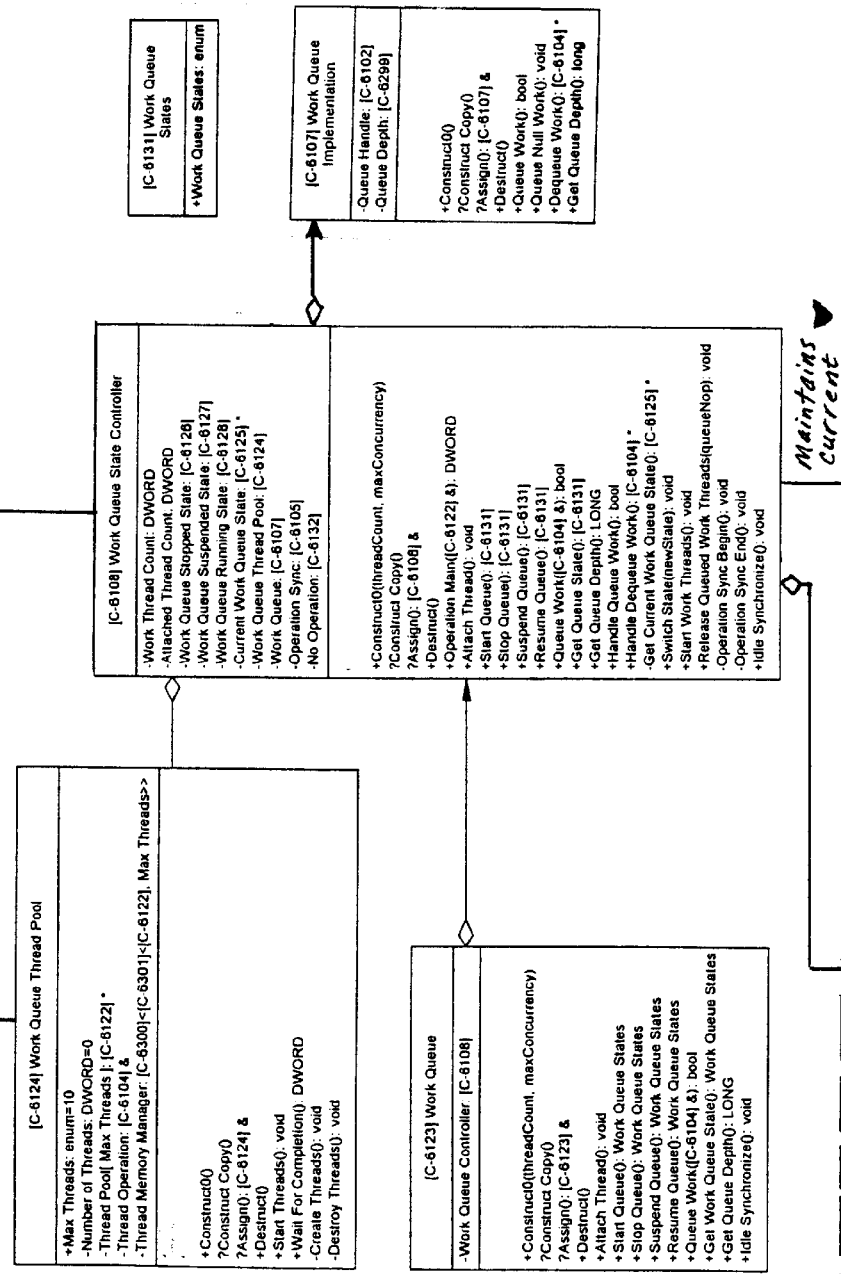
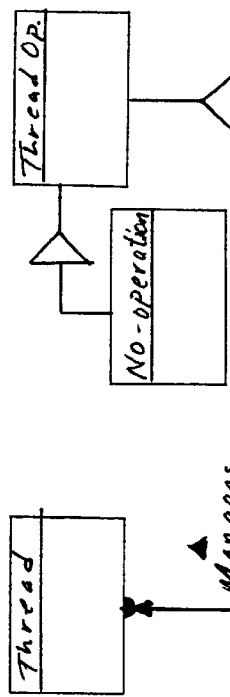
FIG. 3A
FIG. 3

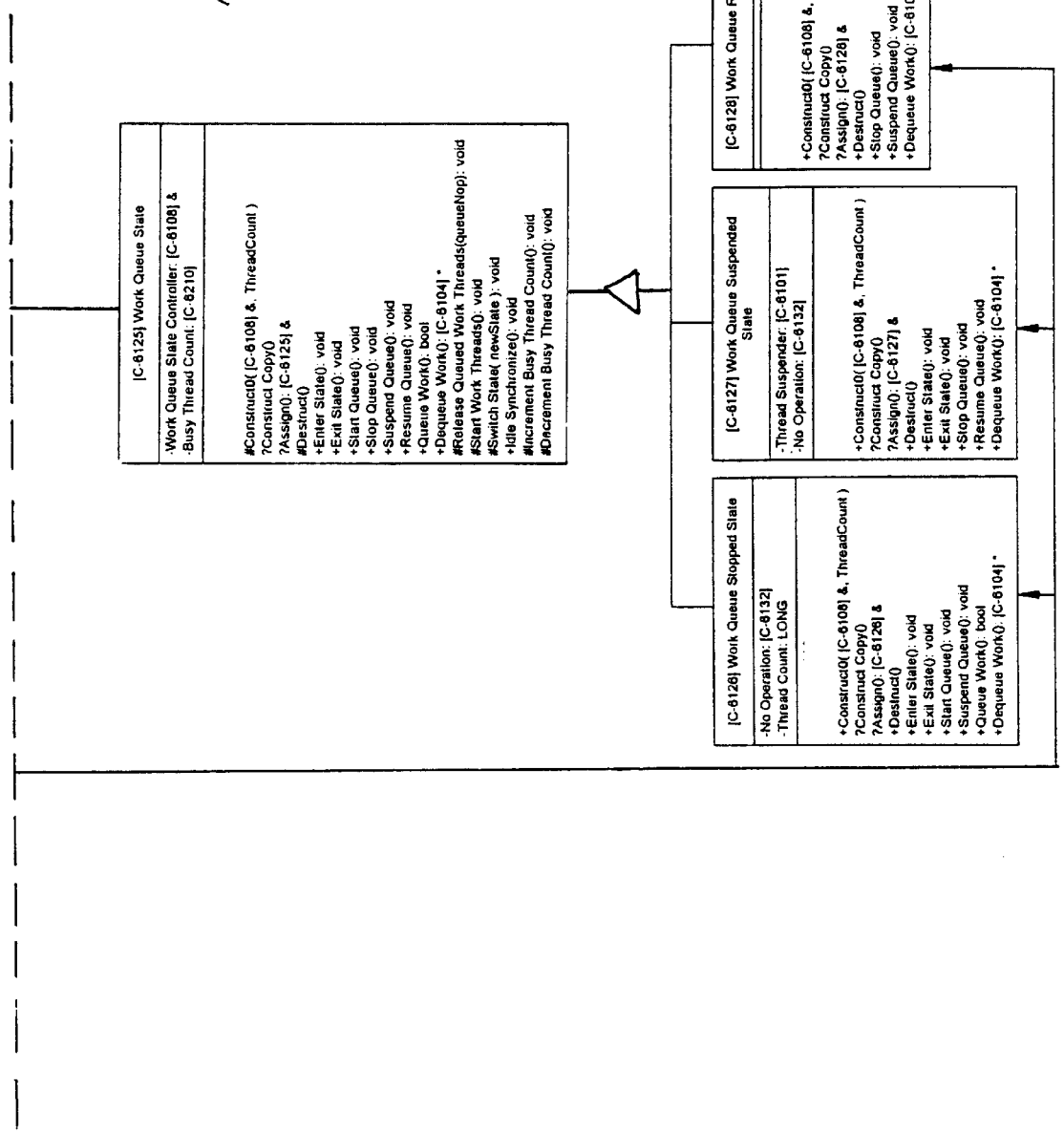

SYSTEM AND METHOD FOR PROVIDING A POOL OF REUSABLE THREADS FOR PERFORMING QUEUED ITEMS OF WORK

RELATED PATENT DOCUMENTS

The present application is related to the co-pending patent application by James Sievert and Mark Vallevand, entitled, "METHOD AND APPARATUS FOR REUSE OF A THREAD FOR DIFFERENT PROGRAMMED OPERATIONS", filed on Sep. 29, 1999 having Ser. No. 09/409,008, the contents of which is incorporated herein by reference.

FIELD OF THE INVENTION

The present invention generally relates to threads of computer program execution, and more particularly to managing a pool of threads for executing queued items of work.

BACKGROUND OF THE INVENTION

A thread is commonly viewed as a light-weight flow of control within a process, wherein a process is a heavy-weight flow of control. A process is heavy-weight in that the operating system allocates a dedicated memory domain for program code and data used by the process, whereas a thread is lightweight in that a thread exists within the memory domain of a process. Some processes are multithreaded such that multiple threads can execute concurrently within a process.

Threads are generally created with support from an operating system and are commonly executed by coupling the thread with a specific operation. That is, a thread is created for the purpose of performing a specific operation. After the operation is complete, the thread may be destroyed or reused in performing the same operation with perhaps different input data.

Creating and initiating new threads can be expensive in terms of consuming operating system resources. Each time a new thread is required, control must be passed to the operating system in order to create the thread, and establish and create any structures required to manage the thread. Thus, some applications create multiple threads for performing the same operation within a process. However, the threads are dedicated to the specific operations for which they were created, which may be inefficient for resource utilization. For example, a first set of threads may be created and dedicated to a first function of a system, and a second set of threads may be created and dedicated to a second function of the system. If demand for the first function is low, wherein only a few of the first set of threads are called upon, and demand for the second function is high, wherein there exists more demand for the second function than there are available threads, then the system's performance may be constrained by the limited number of threads available for performing the second function. In other words, demands for work performed by the second function may be delayed because of the limited number of threads associated with the second function.

The foregoing scenario illustrates a situation where performance may be degraded even though there may be processing capacity available to meet the demand. Specifically, threads associated with the first function are idle while threads associated with the second function are fully utilized.

A method and system that addresses the aforementioned problems, as well as other related problems, is therefore desirable.

SUMMARY OF THE INVENTION

A system and method for managing a pool of threads for executing thread operations. A work queue is provided to support controlled allocation of thread resources for execution of a variety of thread operations. A thread pool is instantiated which includes a plurality of threads, and a work queue having program controllable states is instantiated. Thread operations are queued to the work queue when the work queue is in a running or suspended state, and when the work queue is in a stopped state requests to queue thread operations are denied. In another embodiment, temporary threads can be introduced to the thread pool, for example, to meet a temporary need for additional thread resources.

In accordance with one embodiment of the invention, there is provided a computer program product that is configured to be operable to managing a pool of threads for executing thread operations.

The above summary of the present invention is not intended to describe each disclosed embodiment of the present invention. The figures and detailed description that follow provide additional example embodiments and aspects of the present invention.

BRIEF DESCRIPTION OF DRAWINGS

Other aspects and advantages of the invention will become apparent upon review of the Detailed Description and upon reference to the drawings in which.

Figure 1:
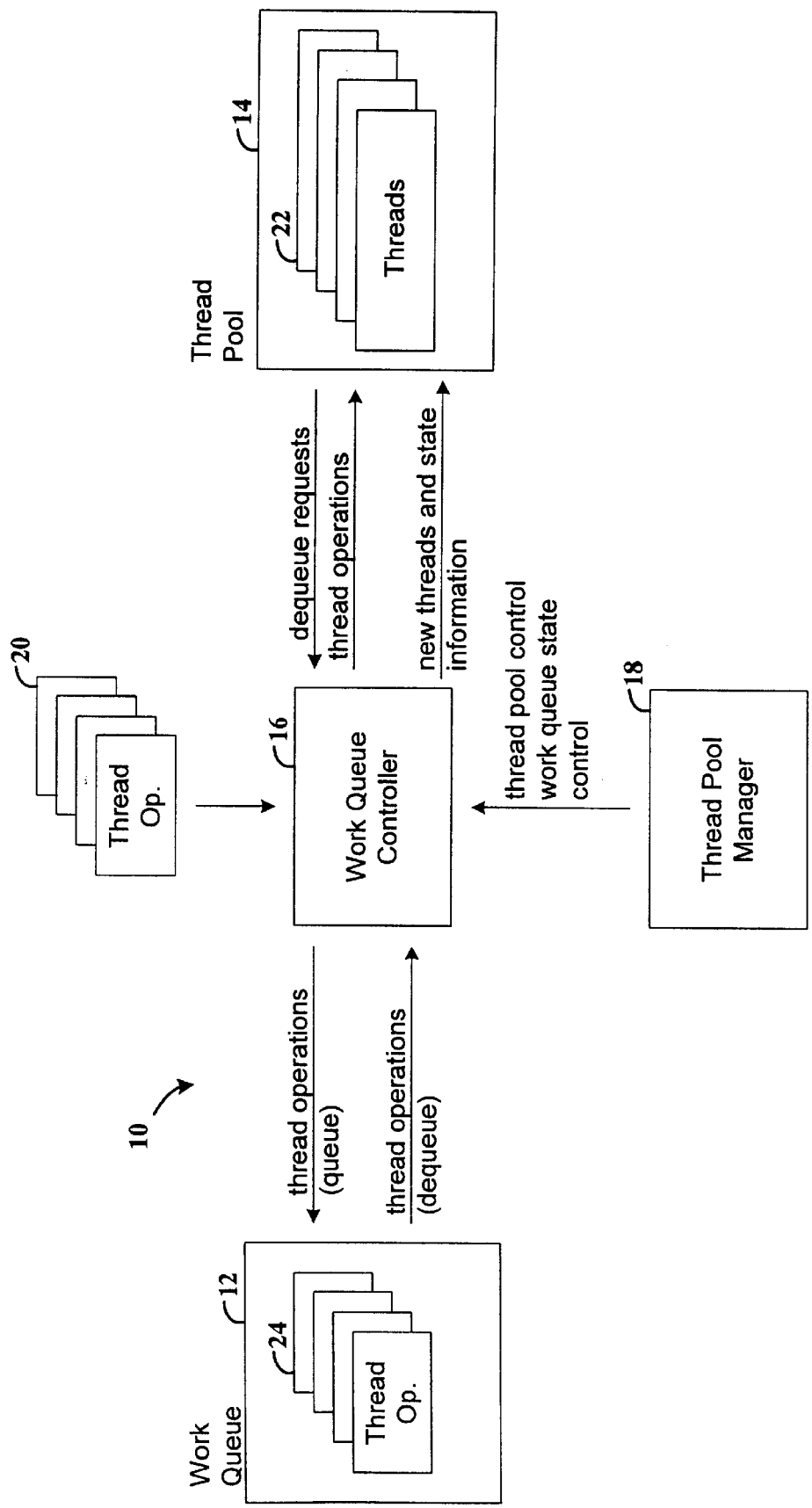
FIG. 1 is a functional block diagram of a system for providing a pool of reusable threads for performing items of work in accordance with one embodiment of the invention.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION

The present invention is believed to be applicable to a variety of systems for managing threads and work to be performed by the threads. The present invention has been found to be particularly applicable and beneficial as implemented in an object oriented programming language. While the present invention is not so limited, an appreciation of the present invention is presented by way of the class definitions used to implement the invention.

FIG. 1 is a functional block diagram of a system for providing a pool of reusable threads for performing items of work in accordance with one embodiment of the invention. System 10 includes work queue 12, thread pool 14, work queue controller 16, and thread pool manager 18. Thread operations 20 make calls to work queue controller 16 to be queued in work queue 12.

Work queue 12 supports a method for managing individual items of work which may be executed by any of threads 22 in thread pool 14. In one embodiment, the queued items of work are WIN32 API calls that are each individually wrapped by thread operations 24 and provided to the Windows NT operating system ("NT") I/O completion port.

Work queue 12 can be in one of three states: stopped, suspended, and running. When the work queue is instantiated, it is initially in the stopped state. Thread operations sought to be queued in work queue 12 are rejected when the work queue is in the stopped state. When work queue 12 is in the suspended state, threads 22 are idle and do not execute thread operations 24. However, new thread operations can be queued to work queue 12 when the work queue is in the suspended state. When work queue 12 is running, threads 22 are executing thread operations 24 and new thread operations can be queued.

Thread pool manager 18 instantiates threads 22 in thread pool 14 using start thread requests that are issued to work queue controller 16. Threads 22 are available for execution of thread operations 24. Because thread creation is expensive in terms of operating system resource requirements, a pool of threads provides the ability to execute new thread operations without having to wait for creation of a new thread.

Work queue controller 16 provides the capability of closely controlling the flow of work (i.e., execution of thread operations 24) with thread pool manager 18. For example, thread pool 14 may be started, stopped, and suspended by thread pool manager 18 via work queue controller 16. When thread pool 14 is stopped, work queue controller 16 will no longer queue thread operations to work queue 12, thread operations 24 not yet started are dequeued and not executed, and thread operations in execution are allowed to complete. When thread pool 14 is suspended, work queue controller will continue to queue thread operations 20 in work queue 12, and thread operations 24 that are not yet started are not dequeued until the thread pool state is changed to running.

In another embodiment of the invention, a plurality of instances of system 10 are created to provide multiple work queues and thread pools. For example, different applications may have different resource requirements. Thus, the thread pool associated with one application may be smaller than the thread pool associated with another application.

Work Queue Controller 16 also provides the capability to temporarily add threads to thread pool 14. This feature may be useful in the context of separate work queues and thread pools for different applications. For example, if during a certain time period a first application has less need for computing resources than a second application, then some of the threads in the thread pool associated with the first application can be temporarily attached to the thread pool of the second application. When the time period has passed, the threads can be removed from the thread pool of the second application and returned to the thread pool of the first application.

Figure 2:
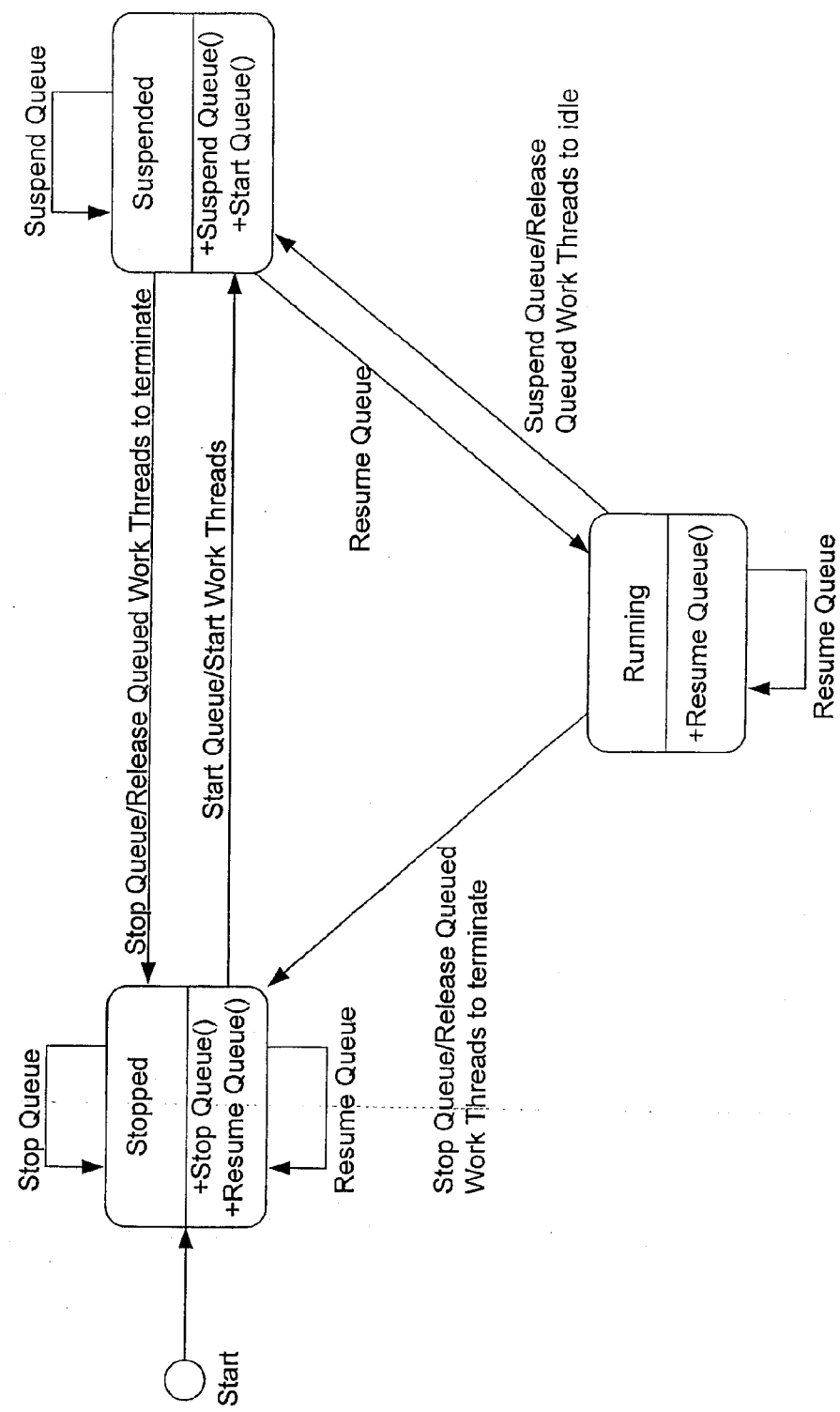
FIG. 2 is a state diagram showing possible states of the thread pool and transitions between the states.

FIG. 2 is a state diagram showing possible states of the thread pool and transitions between the states. The states of thread pool 14 are stopped, suspended, and running. The methods within each of the blocks are the names of the methods that cause the work queue to transition to the associated state. The convention for these diagrams is to show the initial state as entering from the start node.

The Stop Queue and Resume Queue methods cause the work queue to transition to the stopped state, the Suspend Queue and Start Queue methods cause the work queue to transition to the suspended state, and the Resume Queue method causes the work queue to transition to the running state. When thread pool 14 is in the stopped state, calling the Start Queue method causes the thread pool to transition from the stopped state to the suspended state. Calling either of the Resume Queue method or the Stop Queue method when thread pool 14 is in the stopped state causes the thread pool to remain in the stopped state.

When thread pool 14 is in the suspended state, calling the Stop Queue method causes the thread pool to transition to the stopped state. Calling the Resume Queue method causes the thread pool to transition from the suspended state to the running state. Thread pool 14 remains in the suspended state if the Suspend Queue method is called while the thread pool is currently in the suspended state.

When thread pool 14 is in the running state, the calling the Stop Queue method causes the thread pool to transition to the stopped state, and calling the Suspend Queue method causes the thread pool to transition to the suspended state. Calling the Resume Queue method when the thread pool is in the running states causes the thread pool to remain in the running state.

The state transition lines include, by convention, labels that indicate the function causing the state transition followed by the actions taken when the transition occurs. For example, the transition from the Suspended state to the Stopped state is caused by the Stop Queue Function. The change in state results in queued work threads to be released from the queue to terminate. Further details are provided in the figures that follow.

Figure 3A:
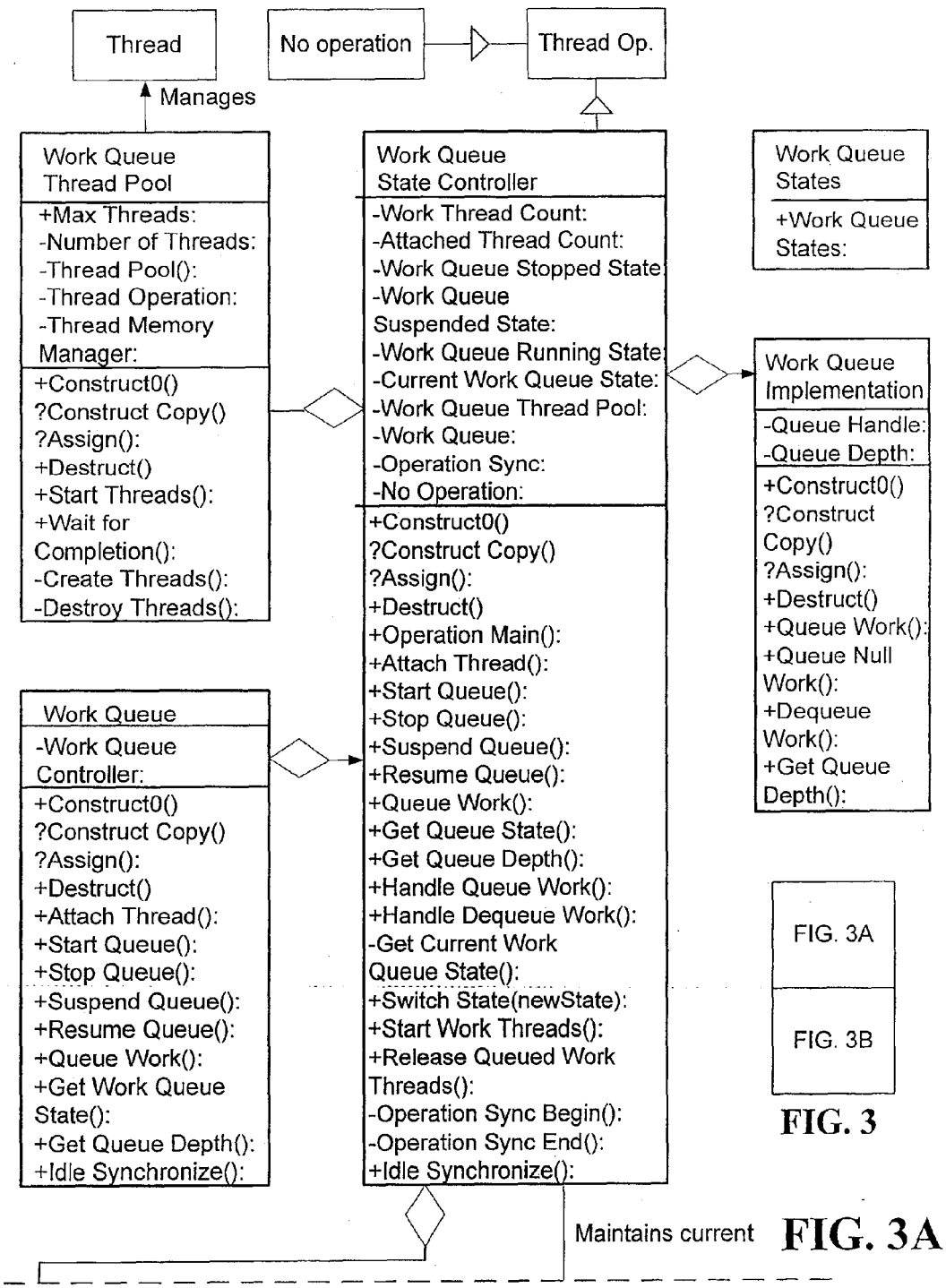
FIG. 3 shows the relationship between FIGS. 3A and 3B, which together comprise a class diagram of one embodiment of a class arrangement for providing reusable threads and a work queue of thread operations.
Figure 3B:
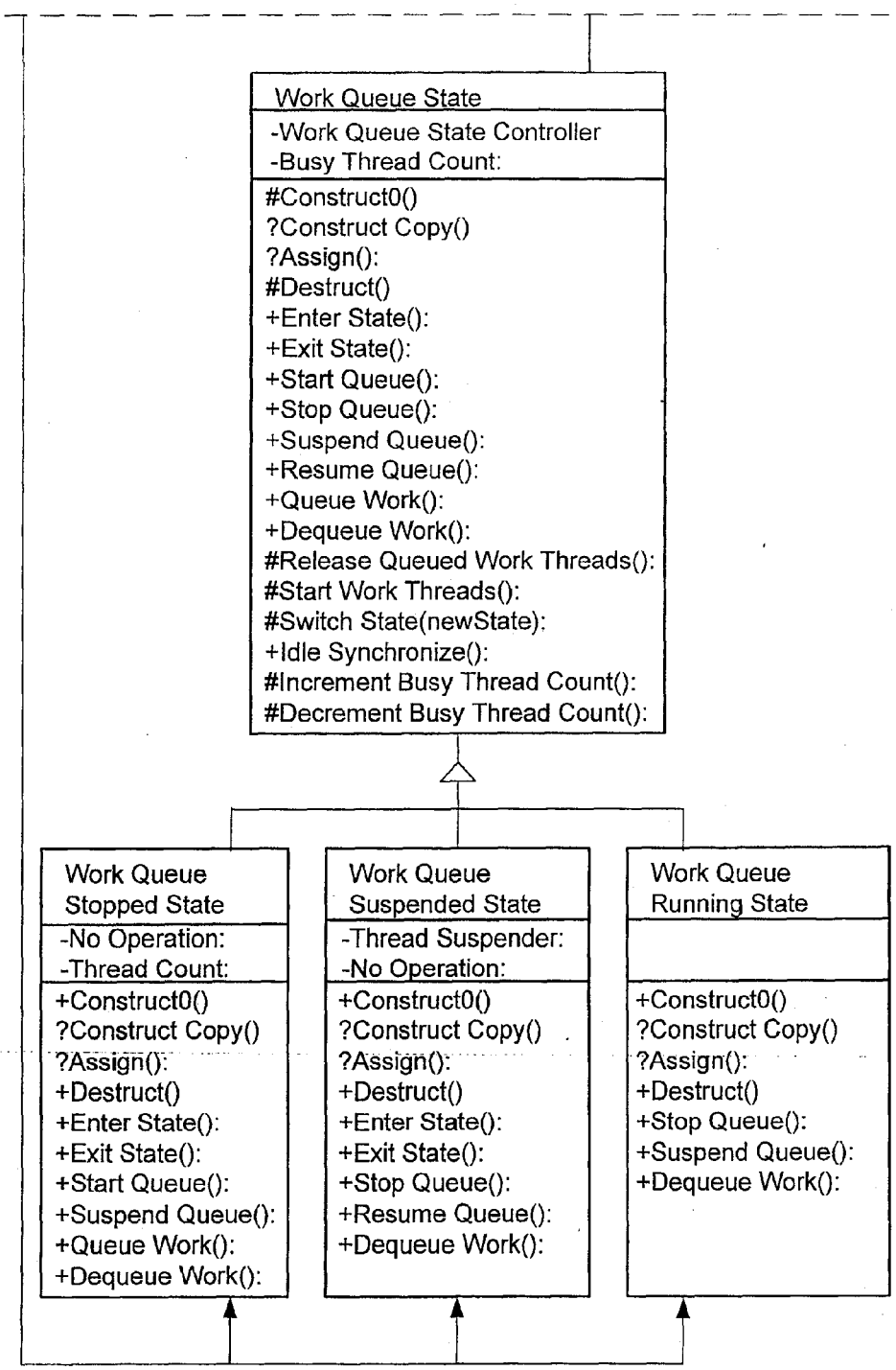
Figure 4:
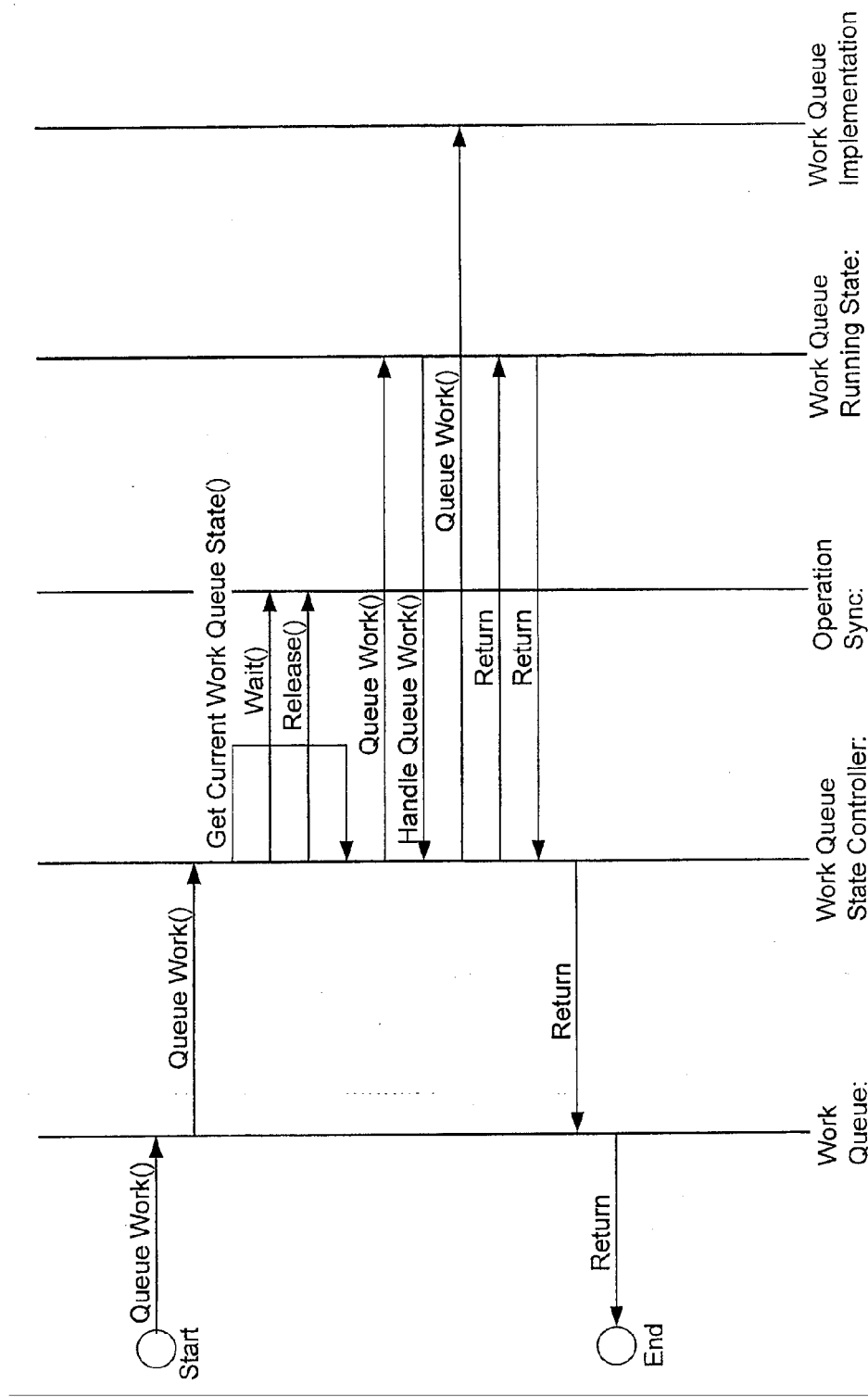
Figure 5:
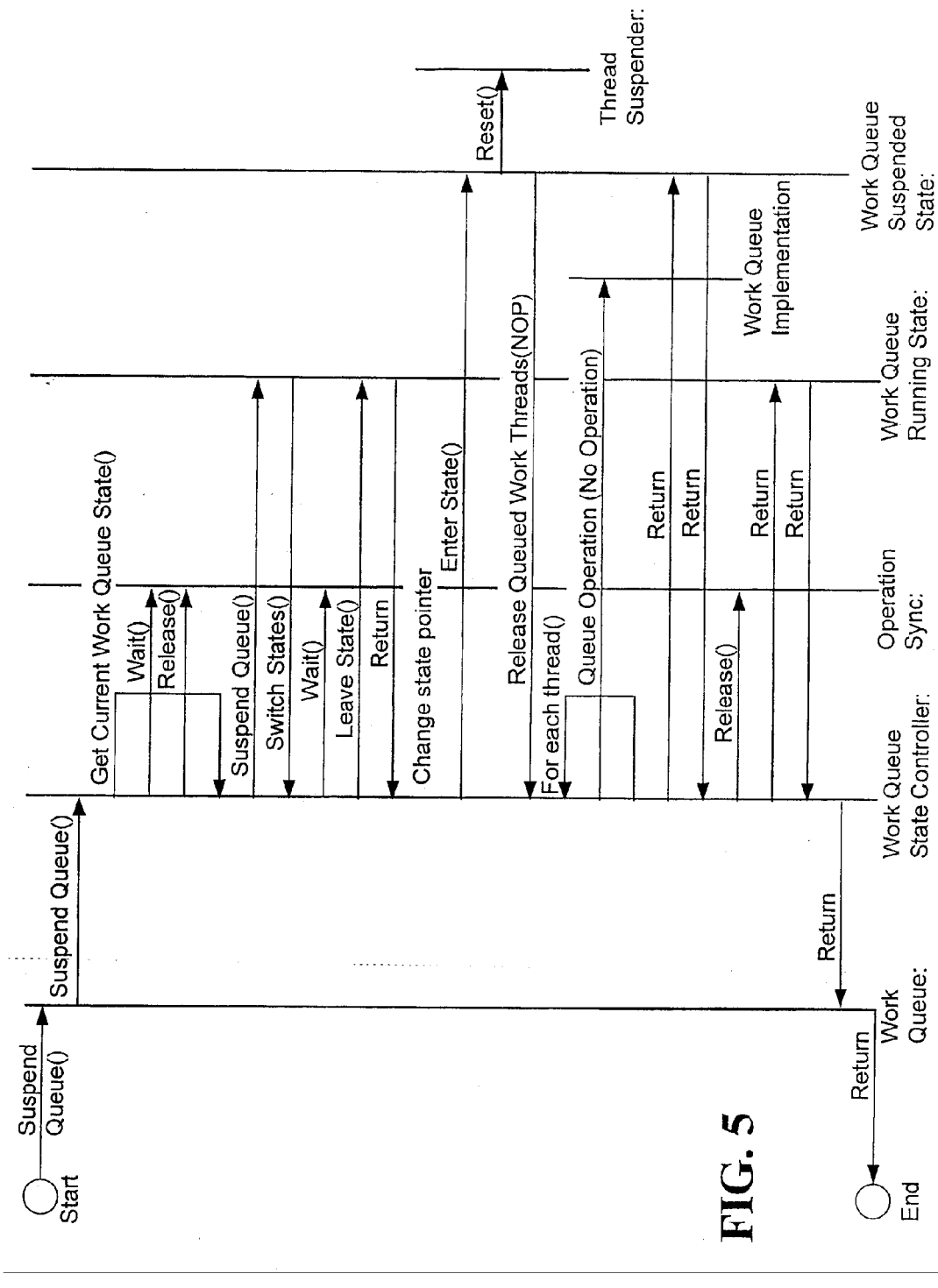
Figure 6:
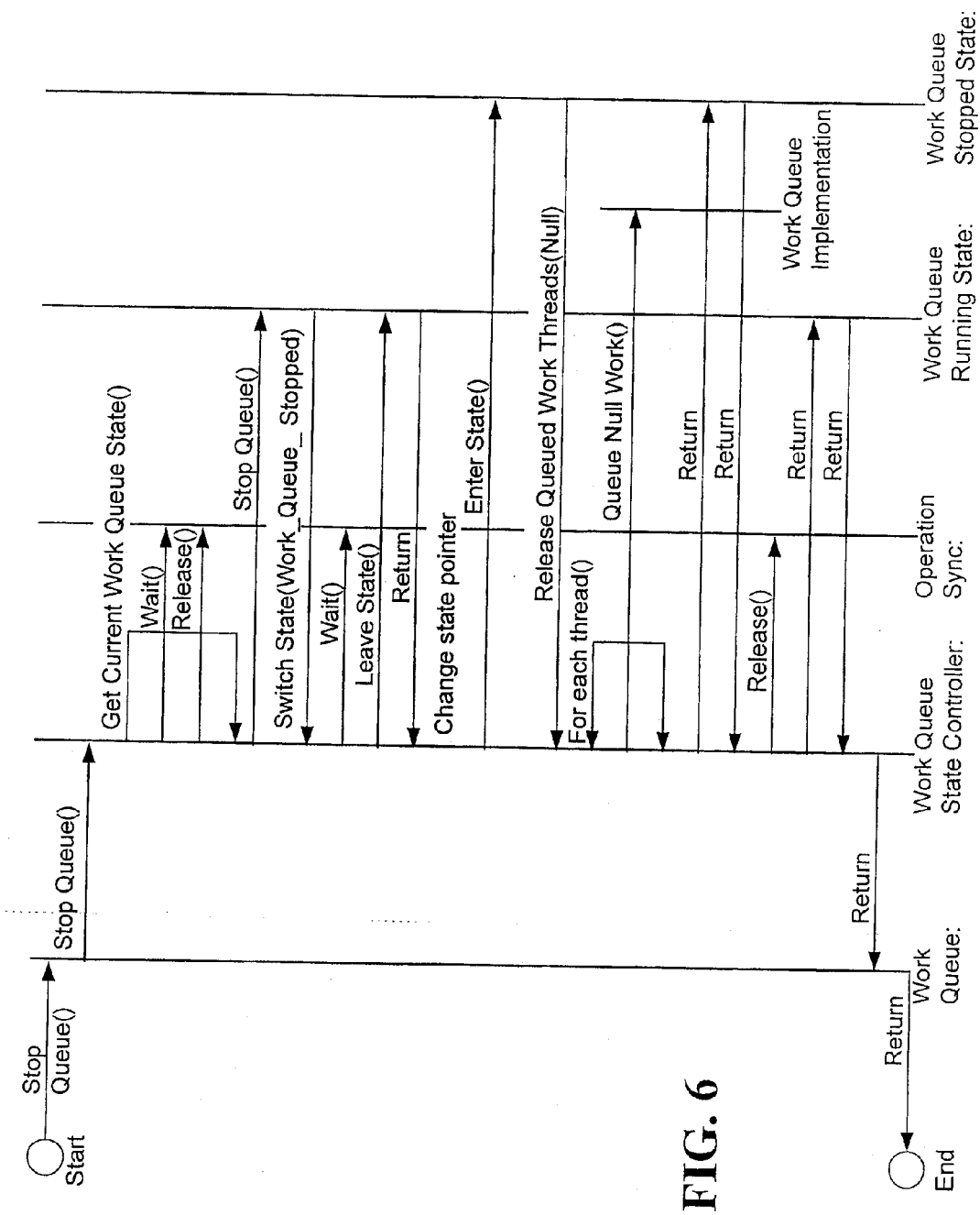
Figure 7:
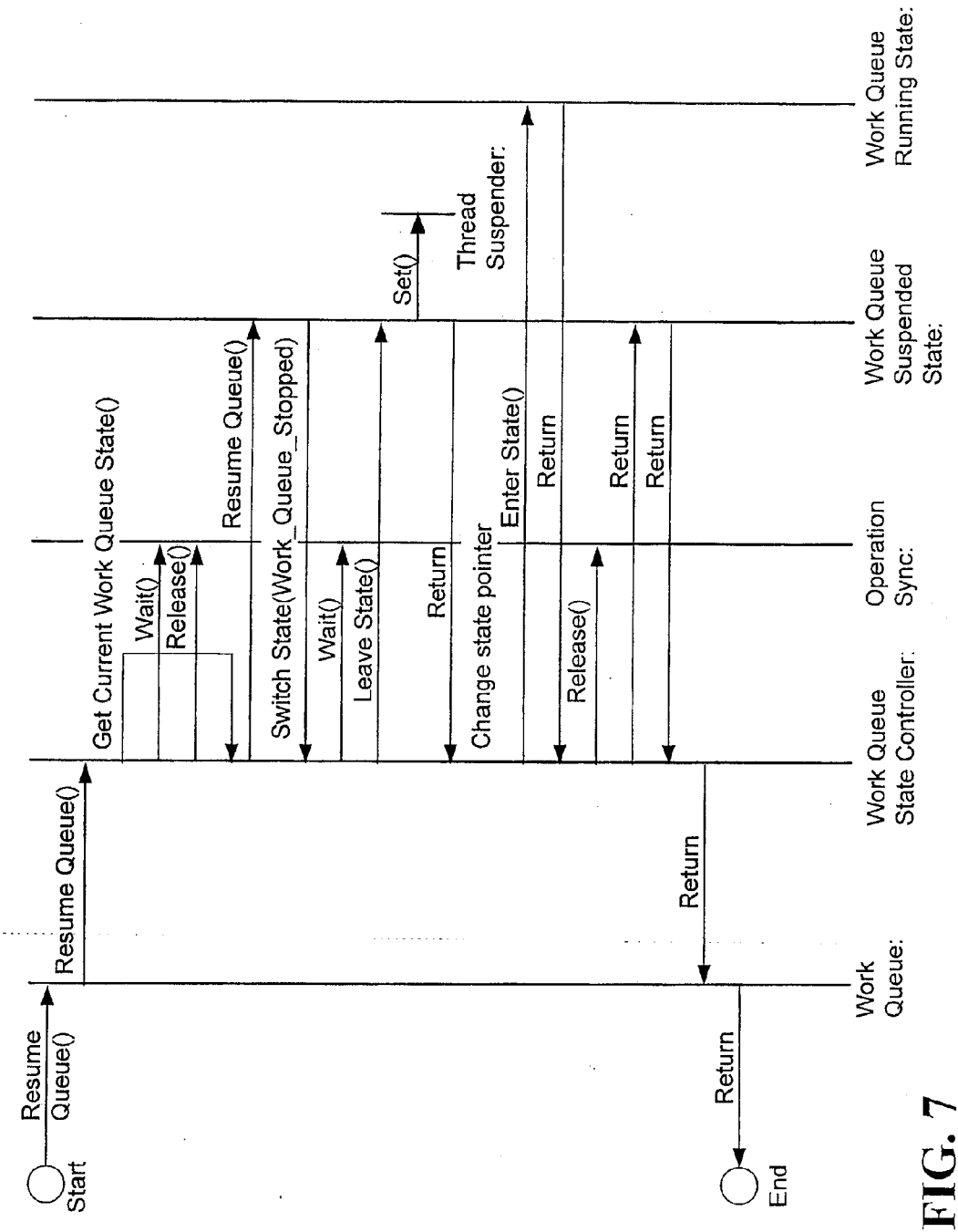
Figure 8:
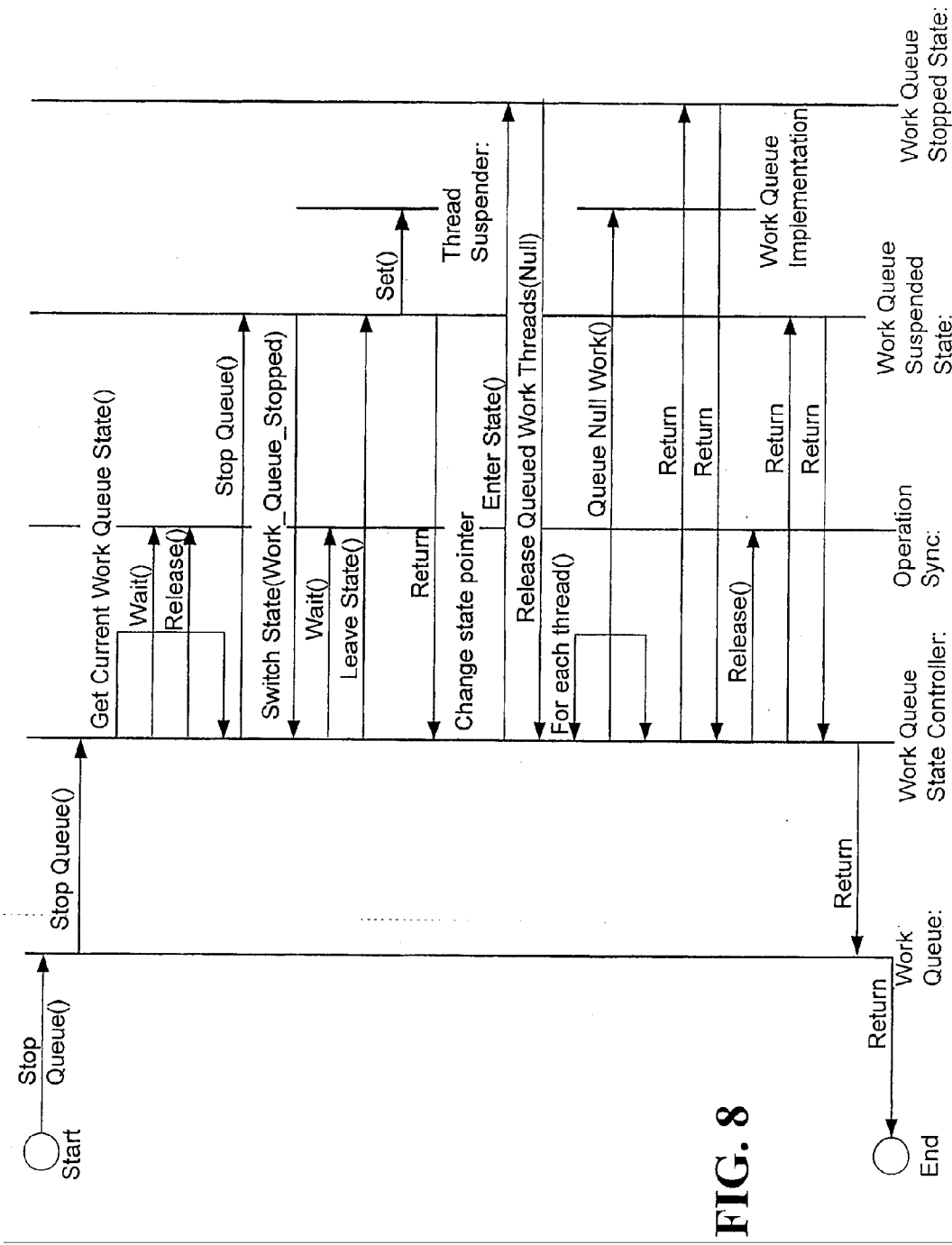
Figure 9:
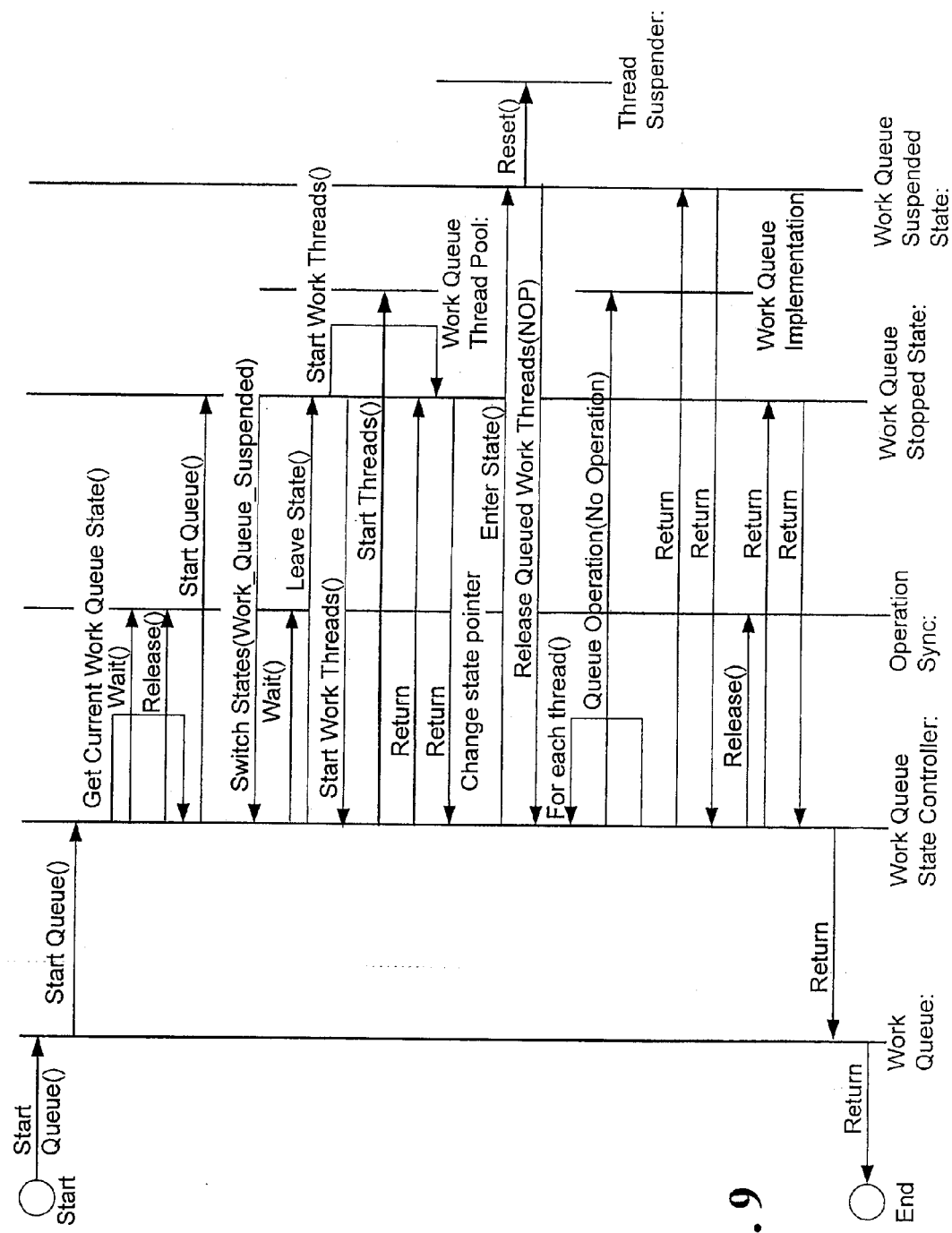
Figure 10:
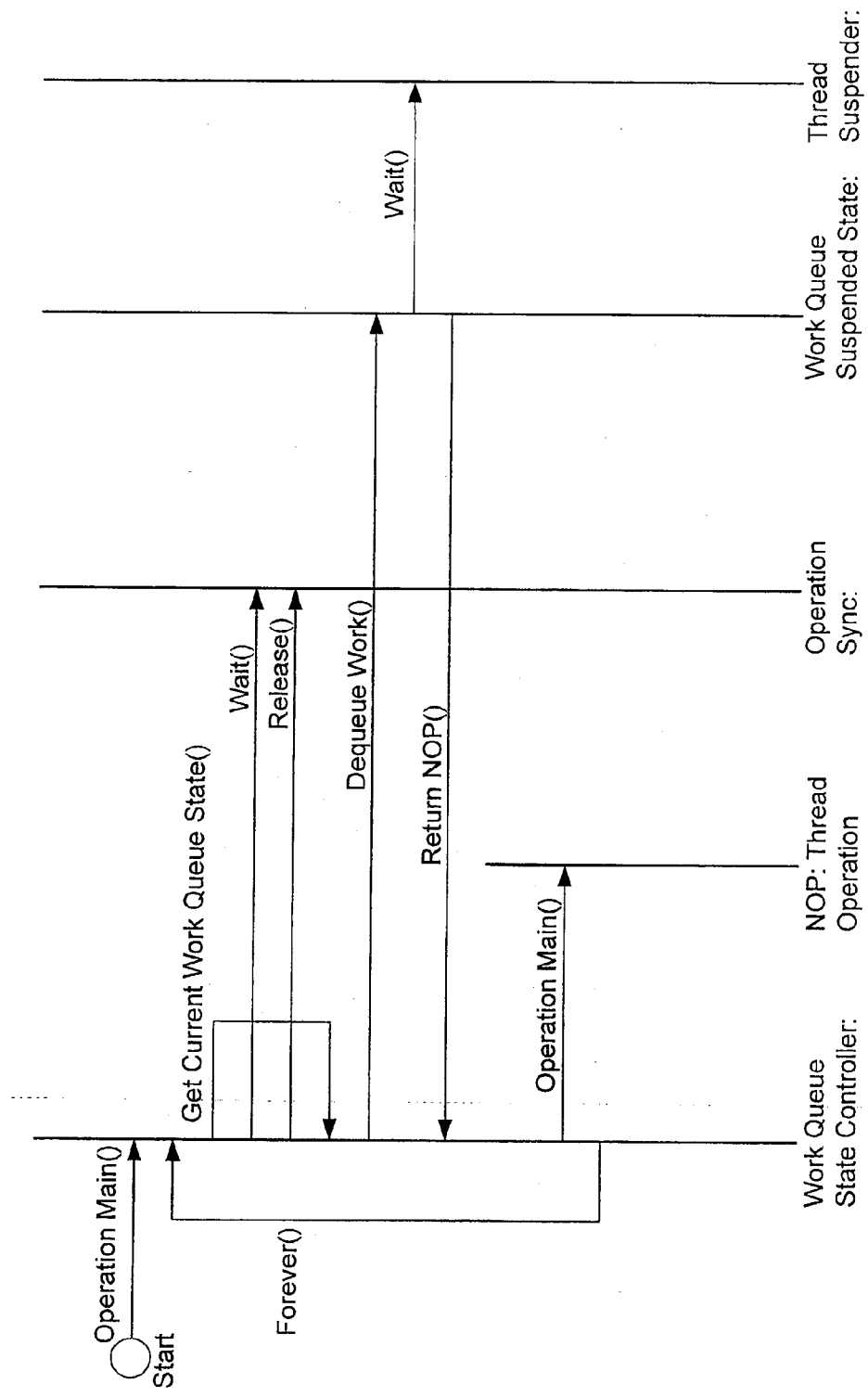
Figure 11:
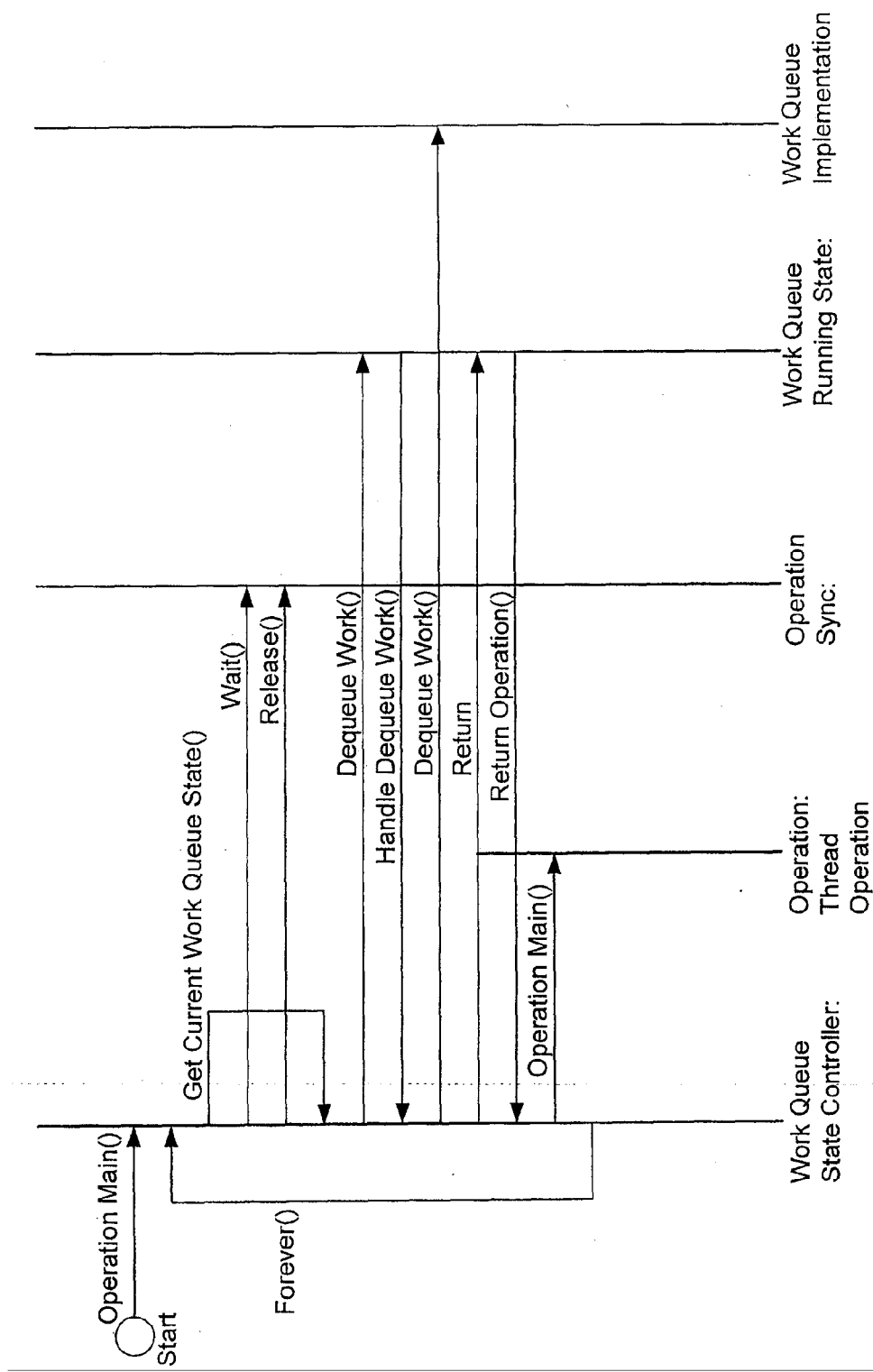
Figure 12:
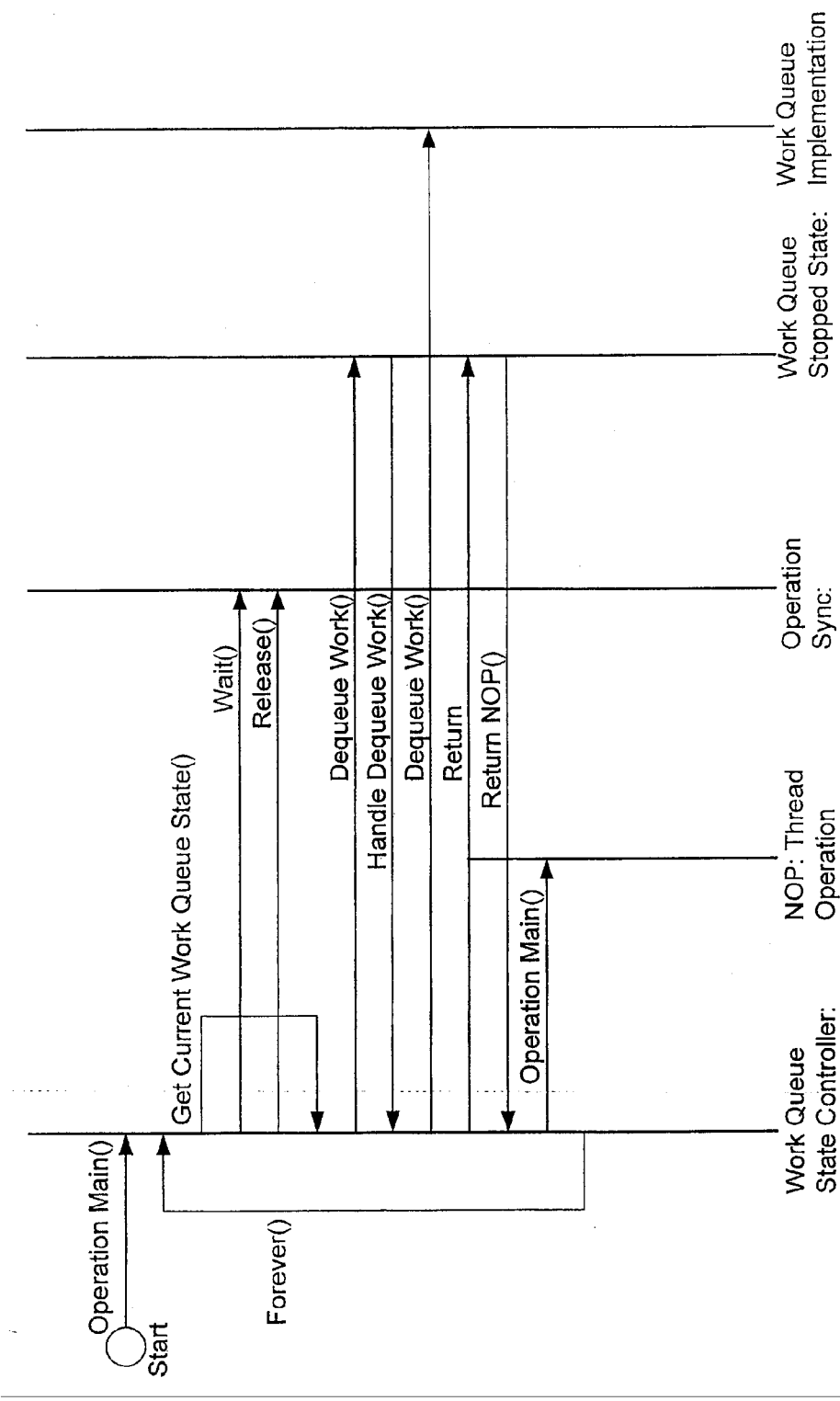
Figure 13:
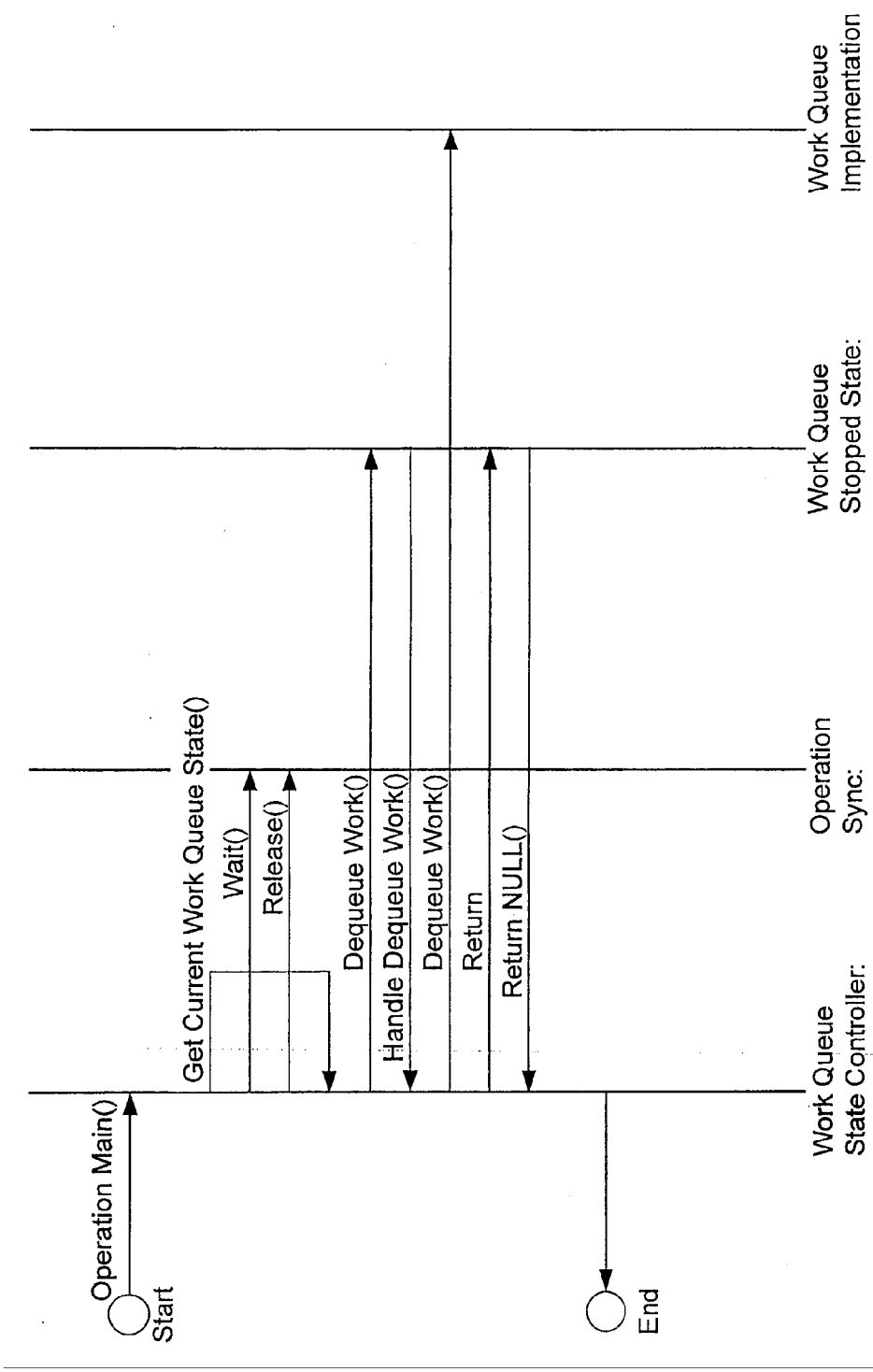

FIG. 3 shows the relationship between FIGS. 3A and 3B, which together comprise a class diagram of one embodiment of a class arrangement for managing a pool of reusable threads and a work queue of thread operations. The figure uses conventional Object Modeling Technique (OMT) notation to denote the classes and class relationships.

An object of the class Work Queue Thread Pool manages objects of the thread class, and objects of the class Work Queue State Controller inherit from the abstract class Thread Operation. The Thread and Thread Operation classes are described in detail in the co-pending patent application.

A Work Queue object has a Work Queue State Controller object, which has a Work Queue Thread Pool object and a Work Queue Implementation object. The arrowhead on the line that links the Work Queue class to the Work Queue State Controller class indicates that the link is one-way. That is, the Work Queue can reference Work Queue State Controller, but the Controller cannot reference the Work Queue. If a link has no arrowheads (for example, between Work Queue Thread Pool and Work Queue State Controller), then it is bi-directional, objects on either side of the link can reference the other.

A Work Queue State Controller object has objects of Work Queue Stopped State, the Work Queue Suspended State, and the Work Queue Running state. Each of the different state objects inherits from the class Work Queue State, which is maintained by an object of the Work Queue State Controller class.

The Work Queue States class encapsulates the enumerated state values of stopped, running, suspended, and unknown.

The attributes and methods of the various classes are described in the paragraphs that follow.

Work Queue Class

The Work Queue class provides the interface through which thread operations are queued to work queue 12 and thread pool 14 is managed.

The Attach Thread method of the Work Queue class can be used to add a thread to thread pool 14. Thus, at times when there is much work to be performed (by way of thread operations in work queue 12), additional threads can be added to thread pool 14 using the Attach Thread method. The thread remains in thread pool 14 until the Stop Queue method is performed. The Stop Queue method drains work queue 12 of thread operations 24, returns the ones of threads 22 that were added to thread pool 14 using the Attach Thread method to control points outside system 10, and suspends the ones of threads 22 that were created for thread pool 14 using the Create Threads method of the Work Queue Thread Pool class.

The Start Queue method is used to change the state of work queue 12 from the stopped state to the suspended state.

The Stop Queue method is used to change the state of work queue 12 to the stopped state.

The Suspend Queue method is used to change the state of work queue 12 from the running state to the suspended state.

The Resume Queue method is used to change the state of work queue 12 from the suspended state to the running state.

The Queue Work method is used to add a thread operation 20 to work queue 12.

The Get Work Queue State method returns the current state of work queue 12.

The Get Queue Depth method returns the number of thread operations in work queue 12 that are waiting to be executed.

The Idle Synchronize method calls through to the corresponding method of the work Queue State Controller class to wait until the queue is idle in the current state. The work queue is idle when there are no queued thread operations in the work queue.

Work Queue Thread Pool Class

The Work Queue Thread Pool class includes attributes and methods for managing thread pool 14.

Max Threads is the maximum number of threads allowed in thread pool 14.

Number of Threads is the number of threads present in thread pool 14.

The Thread Pool attribute references the objects of the class thread.

The Thread Operation attribute references the operation that a thread executes.

The Thread Memory Manager attribute references the memory area in which Thread objects are allocated.

The Assign method implements assignment of one object to another. It is also known as the assignment operator. In this case, it is declared but not defined (no code implementation), because assignment is not supported. If a programmer tried to assign one object to another, the compiler would report an error instead of using the default assignment operator.

The Start Threads method explicitly starts the threads in the pool.

The Wait for Completion method is called to suspend the caller until all threads in the pool have completed.

The Create Threads method calls the operating system to create the threads of thread pool 14.

The Destroy Threads method calls the operating system to release the threads of thread pool 14.

Work Queue State Controller class

The Work Queue State Controller class includes attributes and methods for interfacing between the thread pool implementation and the work queue implementation.

The Work Thread Count is the number of "worker" threads allocated to the thread pool. A "worker" workers thread is a thread of execution, wherein the term worker thread is used to distinguish threads in the pool from other threads.

Attached Thread Count counts the number of threads in thread pool 14 resulting from the Attach Thread method.

The No Operation attribute is an operation that performs no work and which is queued to the Windows NT operating system IO completion port. No Operation objects that are queued at the IO completion port cause threads to wake up, perform the do-nothing operation, and dequeue another queued No Operation object.

The Operation Main method calls the thread operation object dequeued from work queue 12.

The Attach Thread method declares a CThread initialized with the current object, increments the Attached Thread Count, and attaches the thread object to the current thread. The current thread of execution is wrapped or enveloped in a CThread object to allow it to be manipulated with object-oriented syntax and semantics. The thread object is then inserted into the thread pool, where it remains until the work queue is stopped. When the thread is detached from the thread object, control is returned to the Attach Thread method, the Attached Thread Count is decremented, and control is returned to the Work Queue method.

The methods, Start Queue, Stop Queue, Suspend Queue, Resume Queue, Queue Work, Get Queue State, and Get Queue Depth are called from the corresponding methods of the Work Queue class, and call through to the methods of the Work Queue Stopped, Suspended, and Running State classes, depending on the current state of work queue 12.

The Handle Queue Work method calls through to the Queue Work method of the Work Queue Implementation class.

The Handle Dequeue Work method calls through to the Dequeue Work method of the Work Queue Implementation class.

The Get Current Work Queue State method returns the state of Work Queue 12 based on the state of the Work Queue States object.

The Switch State method changes the state of the work queue in a synchronized manner. The method calls a synchronization object to wait for any other state change to complete. Then the current state is exited (by calling the leave state method in the state), the new state is pointed to, and the new state is entered (by calling the enter state method in the state). The thread synchronization is then released.

The Start Work Threads starts execution of the threads in thread pool 14.

The Release Queued work Threads method queues either a no-operation object or a NULL work operation (e.g., a 0 to the IO completion port) for each thread in thread pool 14, depending on the input parameter. A NULL operations causes a thread to terminate, and a no-operation causes a thread to execute the no-operation and enter a new state.

The Operation Sync Begin and operation Sync End methods are used to begin and end thread synchronization in the Switch States method.

The Idle Synchronize method calls the current state to wait until the work queue is idle in the current state.

Work Queue Implementation Class

The Work Queue Implementation class implements work queue 12, using the IO completion ports provided by the Windows NT operating system.

The Queue Handle attribute is a handle to the IO completion port.

The Queue Depth attribute is an interlocked count of the number of operations on the queue. An interlocked count is a word in memory that can be incremented, decremented, or updated with a new value in an indivisible manner. A separate synchronization object is unnecessary since synchronization is built into the interlocked count.

The Queue Work method increments the Queue Depth attribute and queues the referenced thread operation to the IO completion port.

The Queue Null Work method increments the Queue Depth and queues the value 0 to the IO completion port.

The Dequeue Work method gets a pointer to a thread operation from the IO completion port, decrements the Queue Depth, and returns the pointer.

The Get Queue Depth method returns the number of thread operations queued to the IO completion port.

Work Queue State Class

The Work Queue State class manages the state of work queue 12.

The Busy Thread Count attribute is a counted event that signals when the number of busy threads is 0. That is when work queue 12 has 0 thread operations.

The Enter and Exit state methods call through to the corresponding methods in the classes Work Queue Stopped and Work Queue Suspended, depending on the current state of the work queue.

The Start Queue, Stop Queue, Suspend Queue, and Resume Queue methods call through to the appropriate one of the corresponding methods in the classes Work Queue Stopped State, Work Queue Suspended State, and work Queue running State, depending on the current state of the work queue.

The Queue Work method calls back to the Work Queue State Controller to queue the work to the IO completion port.

The Dequeue Work method calls back to the Work Queue State Controller to dequeue the work to the IO completion port.

The Release Queue Work Threads, Start Work Threads, and Switch States methods call through to the corresponding methods in the Work Queue State Controller.

The Idle Synchronize method waits on the Busy Thread Counted event to signal that the work queue is idle and then returns.

The Increment Busy Thread method increments the count of the busy threads in the present state, and the Decrement Busy Thread method decrements the count of busy threads in the present state.

Work Queue Stopped State Class

The Work Queue Stopped State class includes attributes and methods that implement the behavior of the work queue in the stopped state.

The No Operation attribute is a thread operation that performs no work that is returned for thread execution when dequeuing in the stopped state.

The Thread Count is the number of threads 22 in thread pool 14.

The Enter State method releases all threads for termination, and the Exit State method increments the Thread Busy Count for each thread in the thread pool and calls the method Start Work Threads.

The Start Queue method changes the work queue to the suspended state, and the Suspend Queue method calls the Start Queue method with the same result.

The Queue Work method does nothing since work cannot be queued in the stopped state.

The Dequeue Work method calls the Work Queue State Controller to get a thread operation from the IO completion port. If the thread operation is valid, a no-operation is returned instead. This allows the work queue to drain in the stopped state. If the returned work is NULL (a value 0), the busy thread count is decremented and NULL is returned.

Work Queue Suspended State Class

The Work Queue Suspended State implements the behavior of the work queue in the suspended state.

The Thread Suspender attribute is an event that is set when threads are allowed to run, and is cleared when threads are to suspend.

The No Operation attribute is a thread operation that does nothing, which is returned from the Dequeue Work method after the Thread suspender is signaled.

The Enter State method resets the Thread Suspender event to block dequeuing of work and releases all threads with a No Operation. This forces the threads to be dequeued and enter the suspended state and block behind the Thread Suspender event.

The Exit State method sets the Thread Suspender event, thereby allowing dequeue operations to proceed.

The Stop Queue method changes the work queue to the stopped state.

The Resume Queue method changes the work queue to the running state.

The Dequeue Work method decrements the Busy Thread Count. The thread is not busy if it is waiting for the Thread Suspender to signal. The Degueue work method then waits for the Thread Suspender to be signaled, upon which the Busy Thread Count is incremented, and a no-operation is returned. The thread then executes the no-operation and waits for the next available operation.

Work Queue Running State Class

The Work Queue Running State class implements the behavior of the work queue in the running state.

The Stop Queue method changes the state of the work queue from running to stopped, and the Suspend Queue method changes the state of the work queue from running to suspended.

The Dequeue work method first decrements the Busy Thread Count since a thread is not busy if it is waiting for work from the work queue. The method then gets the next thread operation by calling to the Work Queue Implementation. The Busy Thread Count is then incremented and a pointer to the dequeued thread operation is returned.

Each of the pertinent attributes and methods that are members of the various classes are described further in the object interaction diagrams which follow.

Figure 4:
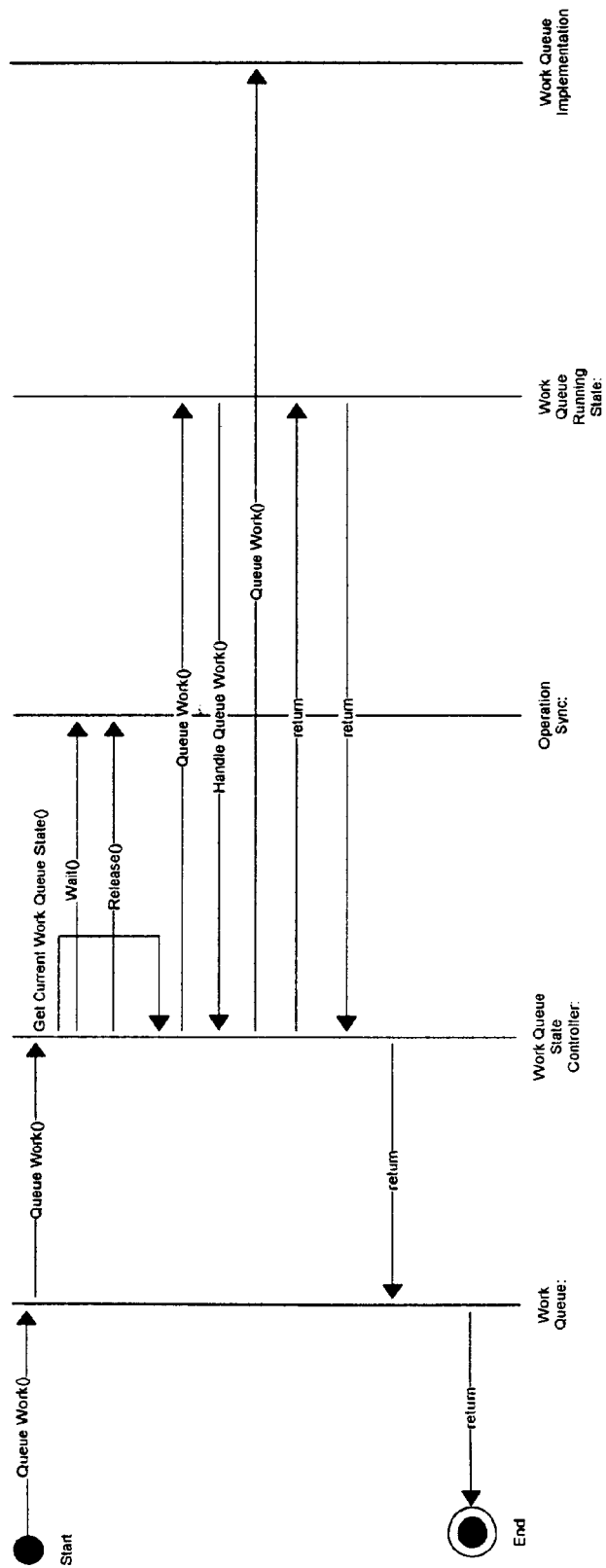
FIG. 4 is an object interaction diagram that illustrates queuing a thread operation when the thread pool is in a running or suspended state.

FIG. 4 is an object interaction diagram that illustrates queuing a thread operation when the thread pool is in a running or suspended state. In this object interaction diagram, as well as in the others that follow, many of the "return" control lines have been omitted to reduce clutter in the drawings. It will be appreciated, however, that returns are implied even though they are not shown.

The Start and End nodes represent a calling program, for example, Thread Pool Manager 18 (FIG. 1). To queue a thread operation 20, the Queue Work method of the Work Queue object is called with a reference to the thread operation to queue, which calls through to the Queue Work method of the Work Queue State Controller object.

The Work Queue State Controller calls its Get Current Work Queue State method to obtain the current state of thread pool 14. The Get Current Work Queue State method calls the Wait method of the Operation Sync object to synchronize with other threads. That is, if another thread is executing in a critical section (e.g. changing the state of the thread pool), the Wait method causes the calling thread to wait until the other thread has completed its critical section, and control is then returned to the Wait Queue State Controller. The Get Current Work Queue State object then obtains a pointer to the current state object (for this diagram, a pointer to a Work Queue Running State Object) and then releases the synchronization. The Get Current Work Queue state method then returns the pointer to the Queue Work method of the Work State Controller object, With the pointer to the Work Queue Running State object, the Work Queue State controller calls the Queue Work Method, which saves the Work Queue Controller reference ("reference" means pointer in this case). The Work Queue Running State object then calls the Handle Queue Work method back in the work Queue State Controller, which calls the Queue Work method in the Work Queue Implementation object. The Work Queue Implementation object increments the queue depth and returns control to the Work Queue State Controller. Control is eventually returned to the original calling program.

Figure 5:
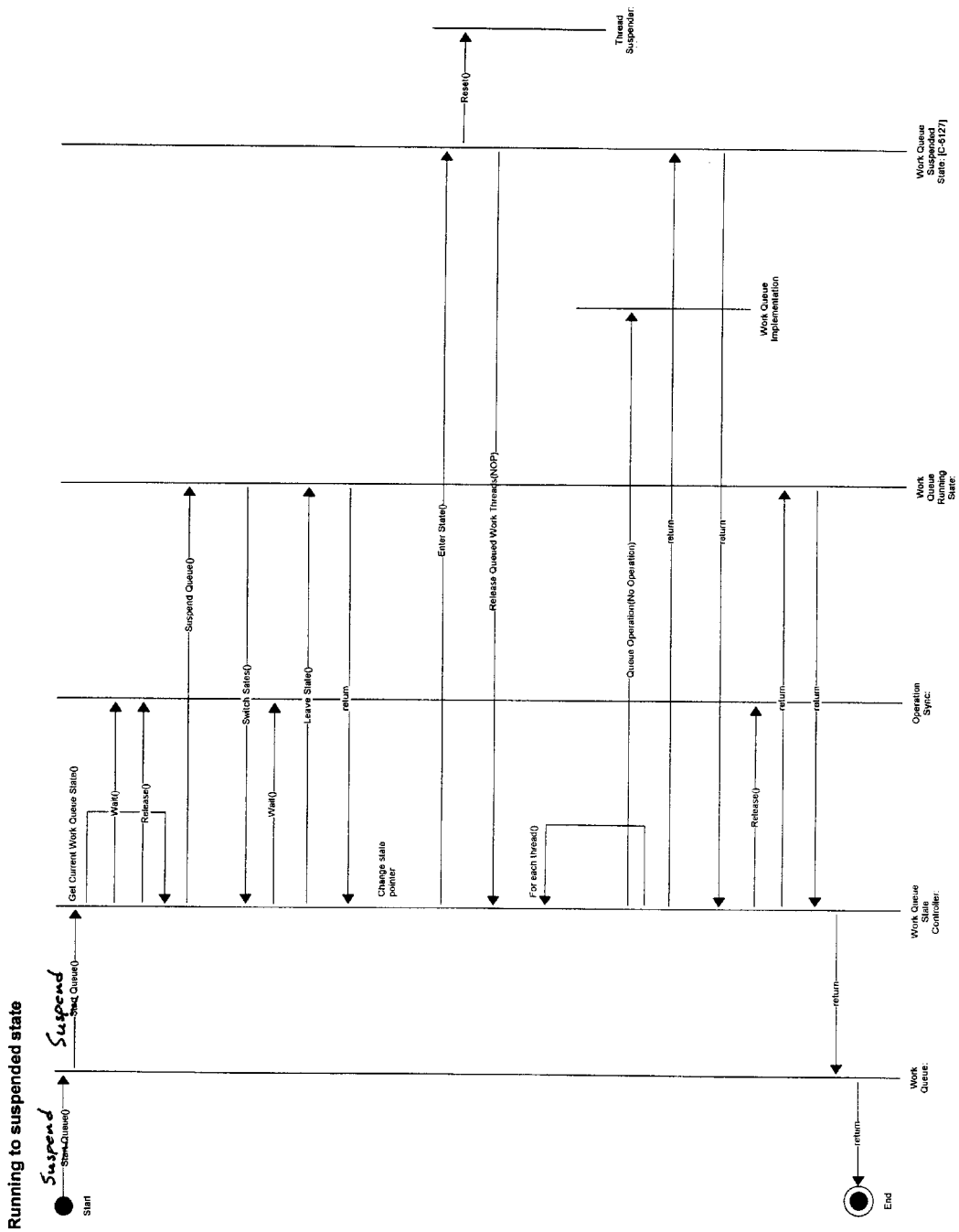
FIG. 5 is an object interaction diagram that illustrates the transition of the thread pool from a running to a suspended state.

FIG. 5 is an object interaction diagram that illustrates the transition of the thread pool from a running to a suspended state. In one use of the invention, thread pool manager 18 controls the state of thread pool 14. Thread pool manager 18 calls the Suspend Queue method of the Work Queue object to initiate the state change from running to suspended, which calls through to the Suspend Queue method of the Work Queue State Controller object.

The Work Queue State Controller object then obtains the current state of thread pool 14 using the Get Current Work Queue State as described above. The pointer to the Work Queue Running State object is then used to call Suspend Queue method in the object. The Work Queue Running State object calls back to the Switch States method of the Work Queue State Controller object, which calls for thread synchronization with the Wait method, exits the current state, and points to the new state. That is, the pointer is switched to the Work Queue Suspended State object. When a state transition occurs, both the old state and new state have a chance to perform any exit or entry actions. The "Leave State()" method is used for exit actions by the old state.

The Switch State method then calls the Enter State method of the Work Queue Suspended State object. The Enter State method resets the suspender event. In other words, the synchronization is released on the suspender event, which essentially releases any suspended thread that is waiting for the "suspender event." Then, the Enter State method calls back to the Release Queued Work Threads method with a NOP (no-operation) parameter to indicate that a no-operation is to be queued for each thread. The Queue Work method of the Work Queue Implementation object is called with the no-operation parameter for each of threads 22 in thread pool 14. Each thread will eventually dequeue a no-operation, which will cause the thread to enter the suspended state. Control is then returned to the Work Queue State Controller object, which releases thread synchronization and returns control to the calling program.

Figure 6:
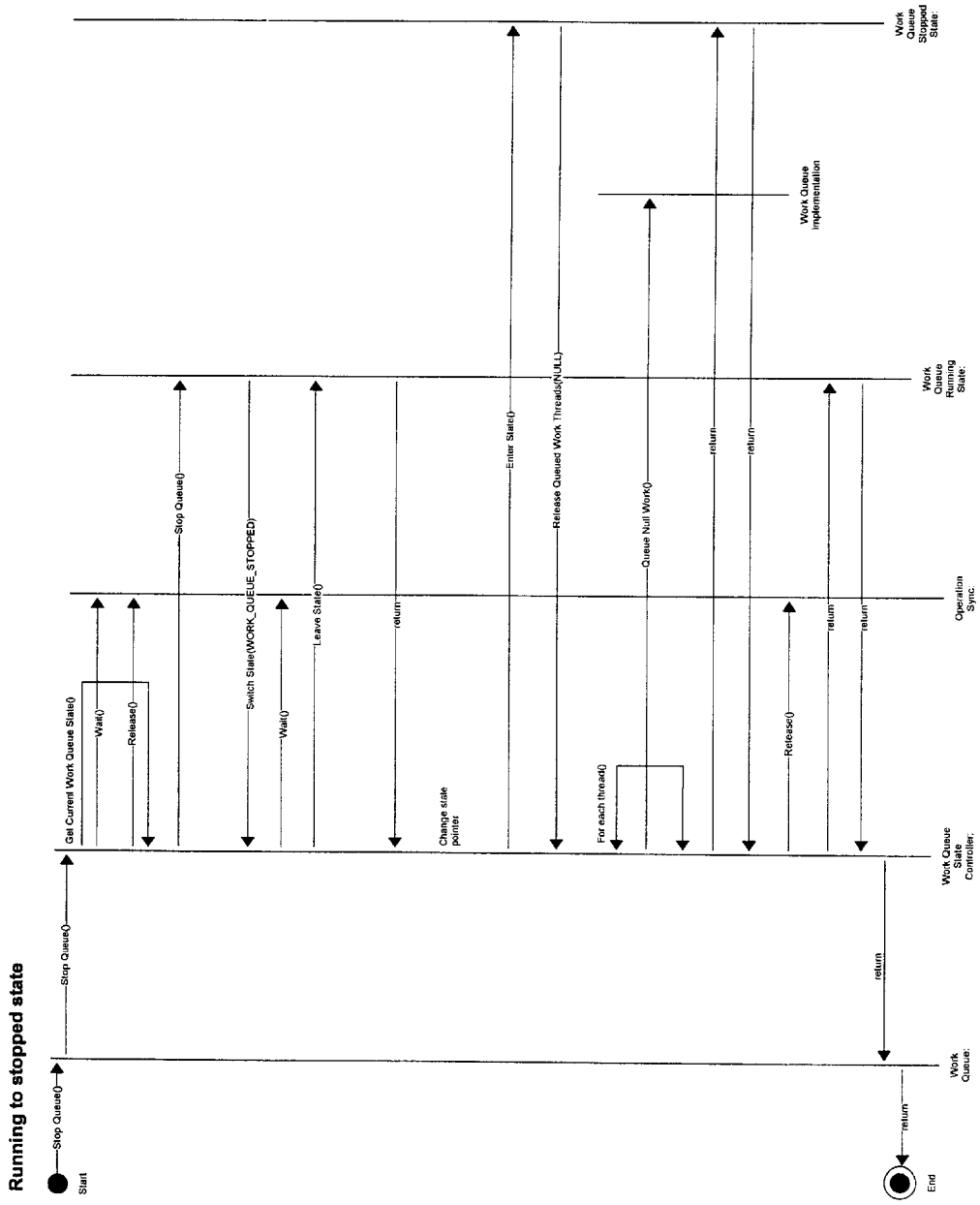
FIG. 6 is an object interaction diagram that illustrates the transition of the thread pool from a running to a stopped state.

FIG. 6 is an object interaction diagram that illustrates the transition of the thread pool from a running to a stopped state. Thread pool manager 18 calls the Stop Queue method of the Work Queue object to initiate the state change from running to stopped, which calls through to the Stop Queue method of the Work Queue State Controller object.

The Work Queue State Controller object then obtains the current state of thread pool 14 using the Get Current Work Queue State as described above. The pointer to the Work Queue Running State object is then used to call Stop Queue method in the object. The Work Queue Running State object calls back to the Switch States method of the Work Queue State Controller object with the WORK_QUEUE_STOPPED parameter, which calls for thread synchronization with the Wait method, exits the current state, and points to the new state. That is, the pointer is switched to the work Queue Stopped State object.

The Switch State method then calls the Enter State method of the Work Queue Stopped State object. The Enter State method is the counterpart to the Leave State method. It is called to perform any entry actions in the new state when a state transition takes place. Then, the Enter State method calls back to the Release Queued Work Threads method with a NULL parameter to indicate that a NULL is to be queued for each thread. The Queue Null Work method of the threads 22 in thread pool 14. Each thread will eventually dequeue a NULL operation, which will cause the thread to enter the stopped state. Control is then returned to the Work Queue State Controller object, which releases thread synchronization and returns control to the calling program.

Figure 7:
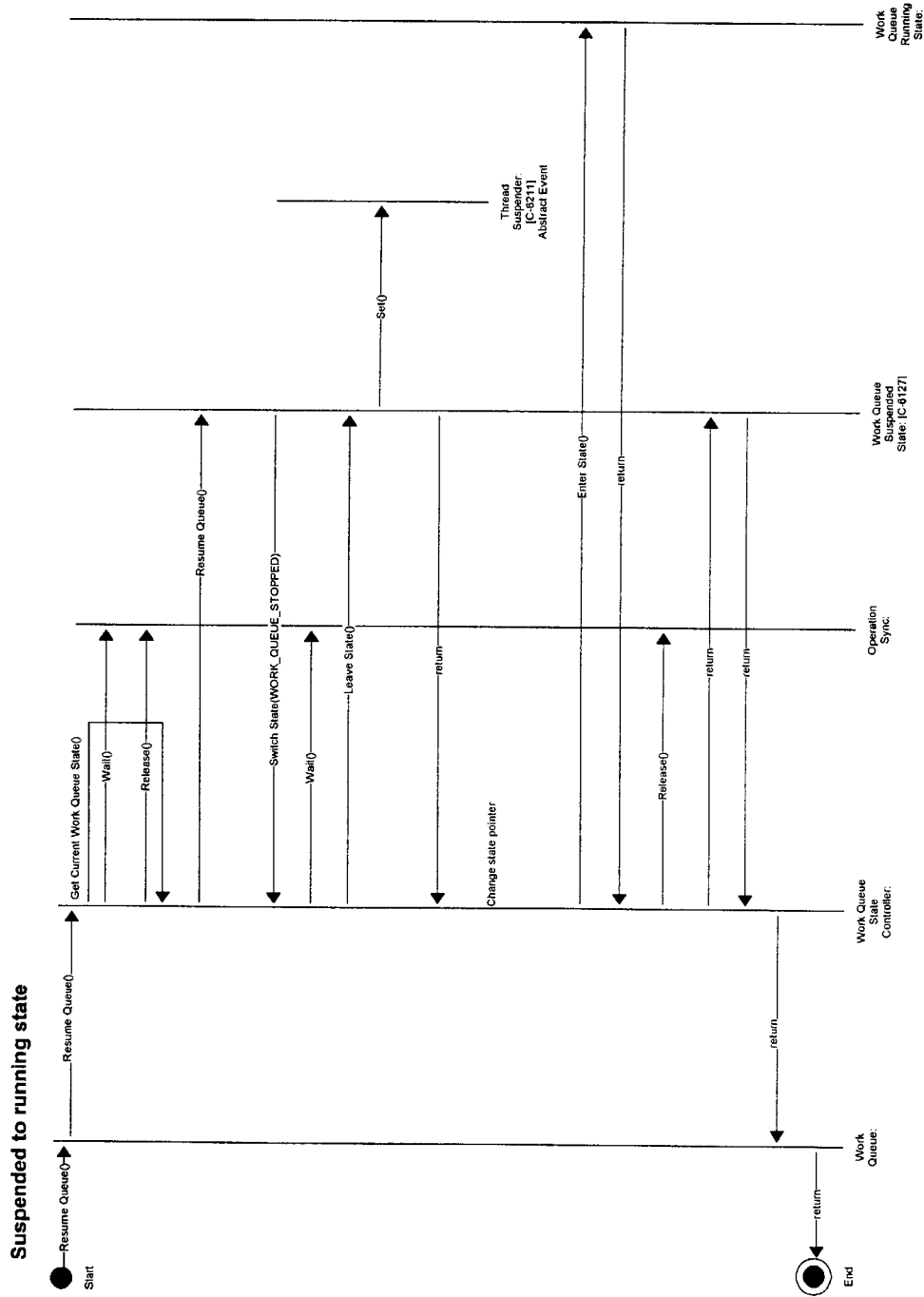
FIG. 7 is an object interaction diagram that illustrates the transition of the thread pool from a suspended to a running state.

FIG. 7 is an object interaction diagram that illustrates the transition of the thread pool from a suspended to a running state. Thread pool manager 18 calls the Resume Queue method of the Work Queue object to initiate the state change from suspended to running, which calls through to the Resume Queue method of the Work Queue State Controller object.

The Work Queue State Controller object then obtains the current state of thread pool 14 using the Get Current Work Queue State as described above. The pointer to the Work Queue Suspended State object is then used to call the Resume Queue method in the object. The Work Queue Suspended State object calls back to the Switch States method of the Work Queue State Controller object with the WORK_QUEUE_STOPPED parameter, which calls for thread synchronization with the Wait method, exits the current state, and points to the new state. The pointer is switched to the Work Queue Running State object. The Leave State method calls the Set method of the Thread Suspender object to serialize state transitions to prevent threads from changing states out from each other. The set call will raise synchronization such that the thread will suspend if any other thread has already called set.

The Switch State method then calls the Enter State method of the Work Queue Running State object. Control is then returned to the Work Queue State Controller object, which releases thread synchronization and returns control to the calling program.

Figure 8:
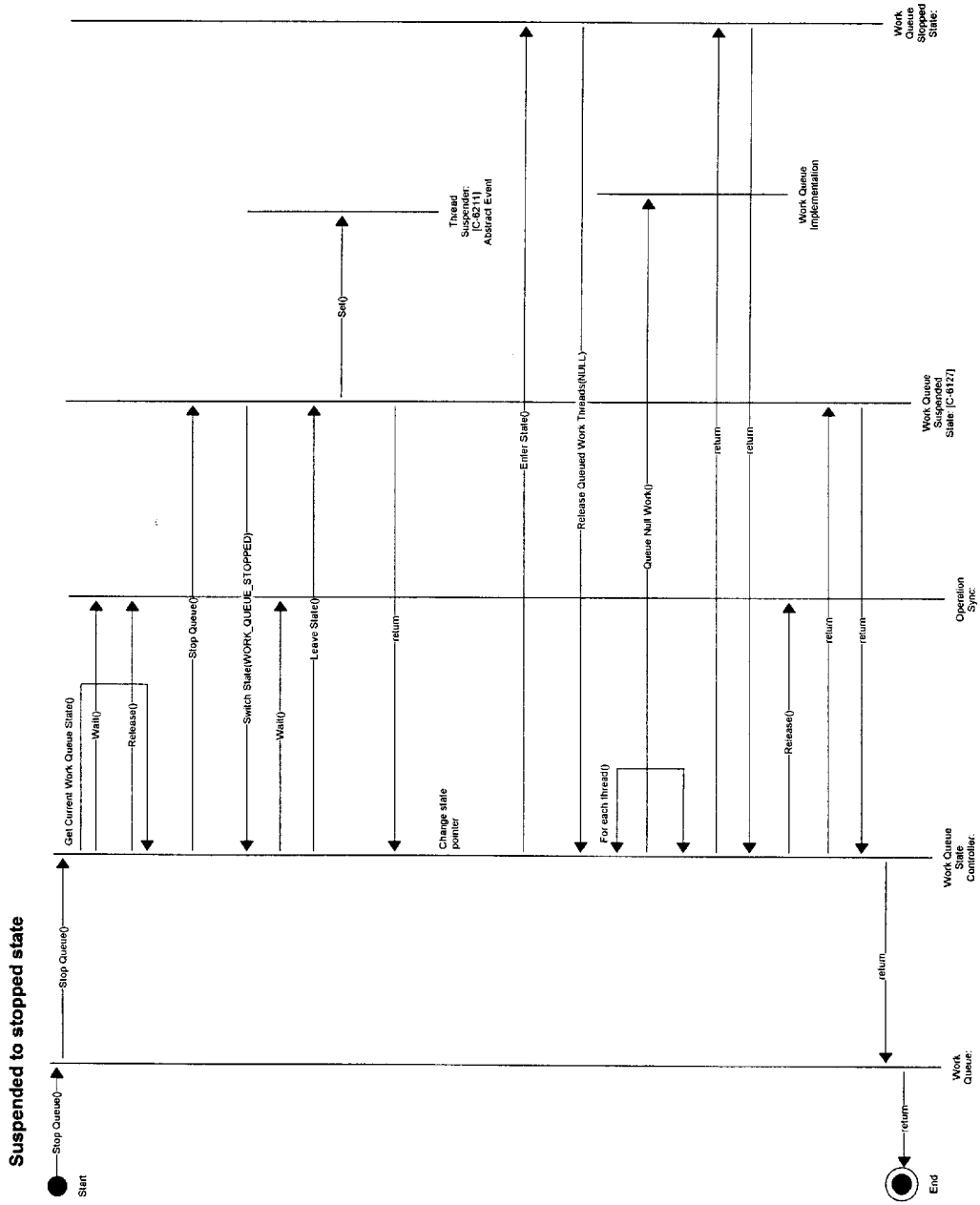
FIG. 8 is an object interaction diagram that illustrates the transition of the thread pool from a suspended to a stopped state.

FIG. 8 is an object interaction diagram that illustrates the transition of the thread pool from a suspended to a stopped state. The processing is similar to the transition from the running state to the stopped state, with the exception that the Leave State method of the work Queue Suspended State object calls the Set method of the Thread Suspender object.

Figure 9:
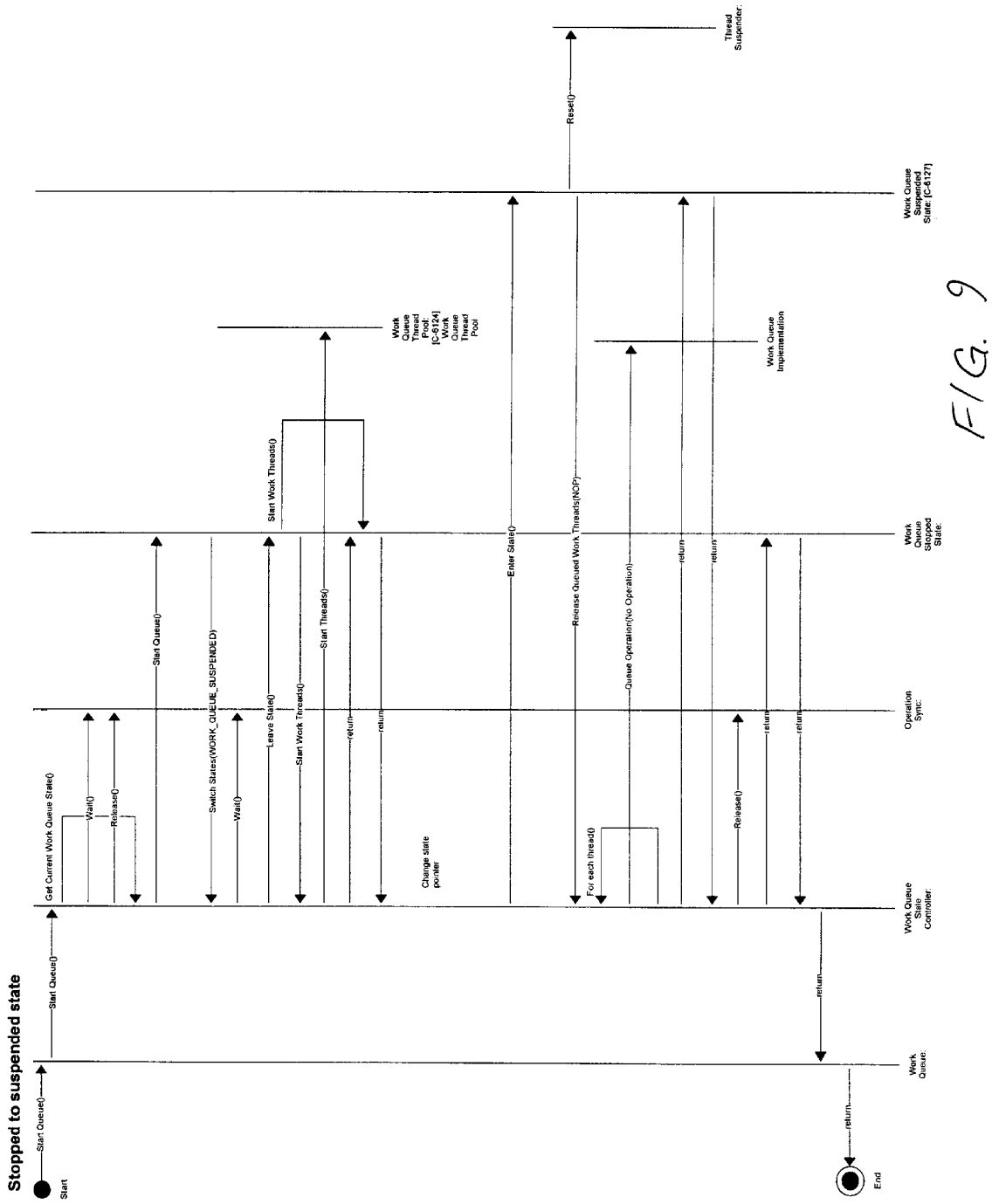
FIG. 9 is an object interaction diagram that illustrates the transition of the thread pool from a stopped to a suspended state.

FIG. 9 is an object interaction diagram that illustrates the transition of the thread pool from a stopped to a suspended state. Thread pool manager 18 calls the Start Queue method of the work Queue object to initiate the state change from stopped to suspended, which calls through to the Start Queue method of the Work Queue State Controller object.

The work Queue State Controller object then obtains the current state of thread pool 14 using the Get Current Work Queue State as described above. The pointer to the Work Queue Stopped State object is then used to call Start Queue method in the object. The Work Queue Stopped State object calls back to the Switch States method of the Work Queue State Controller object with the WORK_QUEUE_SUSPENDED parameter, which calls for thread synchronization with the wait method.

The Leave State method of the Work Queue Stopped State object calls the Start Work Threads method, which calls back to the Start Work Threads method of the Work Queue State Controller object. The Start work Threads method first waits for any running threads to complete (and deleted from the thread pool) and then calls the Start Threads method of the work Queue Thread Pool object to start the new threads in thread pool 14. After the treads are started, control is returned to the Work Queue State Controller object, and processing continues as described above in FIG. 5.

Figure 10:
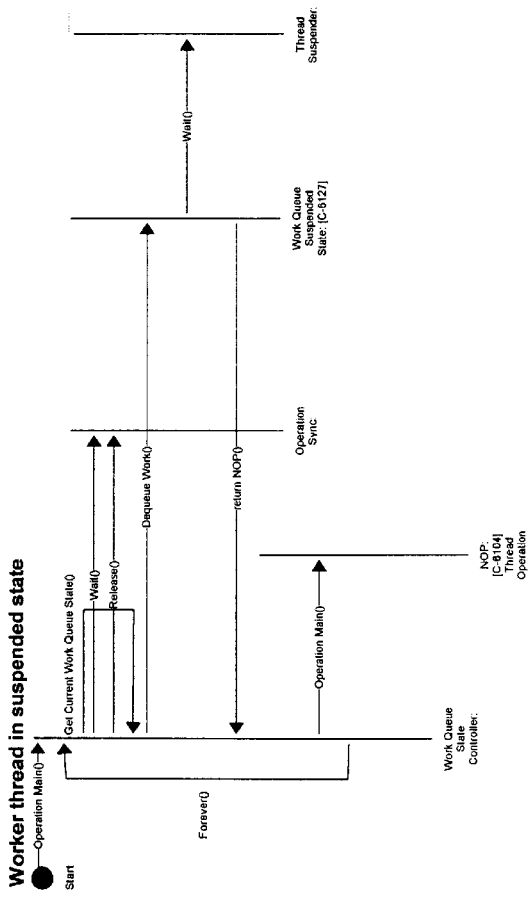
FIG. 10 is an object interaction diagram that illustrates execution of a thread when the thread pool is in a suspended state.

FIG. 10 is an object interaction diagram that illustrates execution of a thread when the thread pool is in a suspended state. Thread execution is started with the Operation Main method of the Work Queue State Controller object. The thread first obtains the current state of thread pool 14 as described above and then calls the Dequeue Work method of the Work Queue Suspended State object.

The Dequeue Work method first decrements the count of busy threads. Since no work has yet been dequeued for the thread, the thread is not busy. Then the Wait method of the Thread Suspender object is called to wait to be signaled. When control is returned to the Work Queue suspended State object, the count of busy threads is incremented, and a no-operation is returned as the work for the thread. The Work Queue State Controller object then calls the Operation Main method of the no-operation object. The no-operation object is a thread operation. The thread executes the no-operation thread operation and then waits for the next available operation. Under normal operation, the NOP operation execution will complete and the thread will realize that the state has changed. The reason for the NOP is to wakeup any suspended threads so they can realize that the state has changed.

Figure 11:
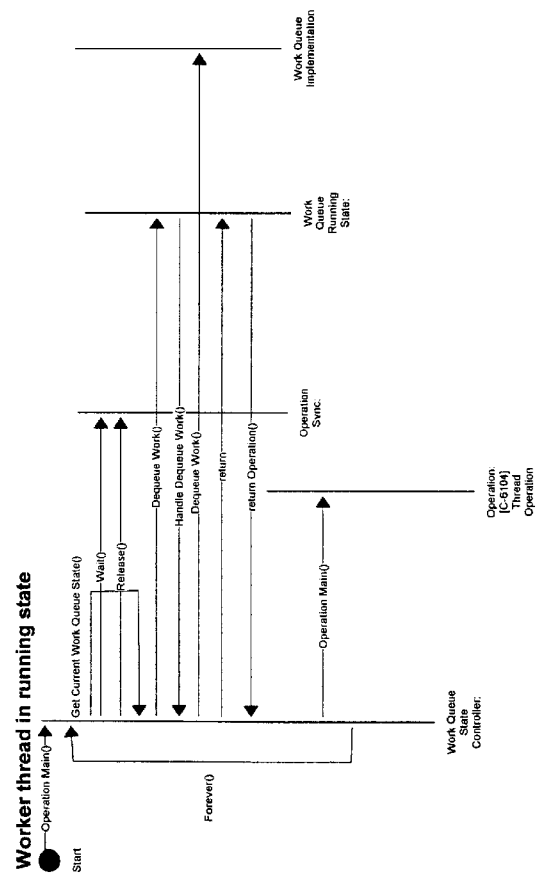
FIG. 11 is an object interaction diagram that illustrates execution of a thread when the thread pool is in a running state.

FIG. 11 is an object interaction diagram that illustrates execution of a thread when the thread pool is in a running state. Thread execution is started with the Operation Main method of the Work Queue State Controller object. The thread first obtains the current state of thread pool 14 as described above and then calls the Dequeue Work method of the Work Queue Running State object.

The Dequeue Work method decrements the count of busy threads and calls the Handle Dequeue Work method of the Work Queue State Controller object, which calls the Dequeue Work method of the Work Queue Implementation object. The Work Queue Implementation object gets a thread operation from work queue 12 (if one is available, decrements the depth of the work queue, and casts and returns the thread operation to the Work Queue State Controller object. Control is then returned to the Work Queue Running State object, and then to the Work Queue State Controller object. The Operation Main method of the Operation object is called to execute the thread operation. The Operation object is instantiated from a user-defined class that is a thread operation class.

When the thread has completed execution of the thread operation object, the thread returns to get the state of the thread pool and dequeue another thread operation.

Figure 12:
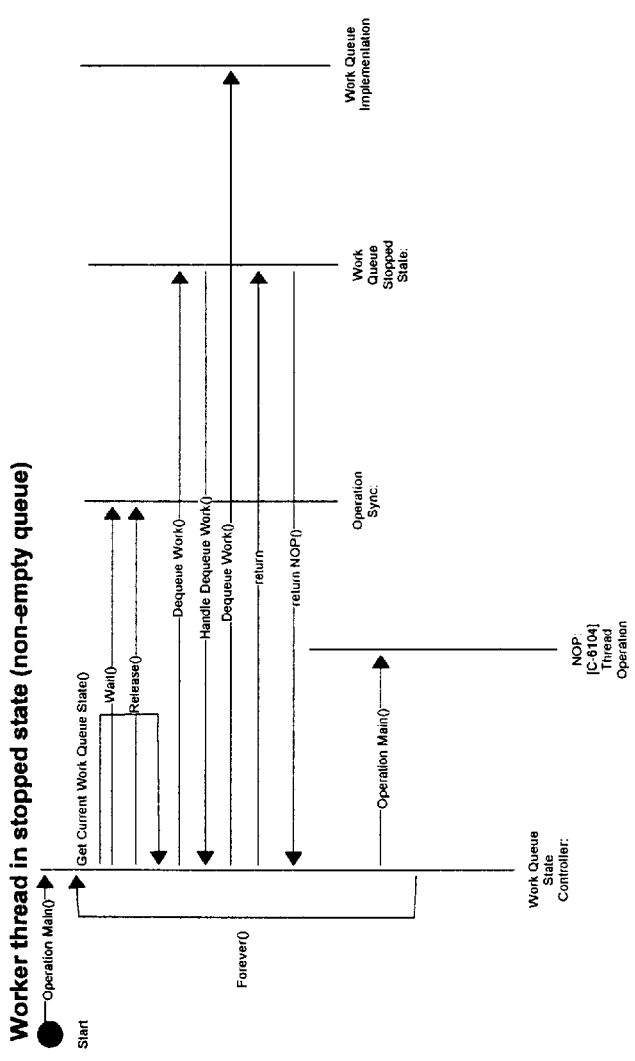
FIG. 12 is an object interaction diagram that illustrates execution of a thread when the thread pool is in a stopped state and the work queue is not empty.

FIG. 12 is an object interaction diagram that illustrates execution of a thread when the thread pool is in a stopped state and the work queue is not empty. Thread execution is started with the Operation Main method of the Work Queue State Controller object. The thread first obtains the current state of thread pool 14 as described above and then calls the Dequeue Work method of the Work Queue Stopped State object.

The Dequeue Work method calls the Handle Dequeue Work method of the Work Queue State Controller object, which calls the Dequeue Work method of the Work Queue Implementation object. The Work Queue implementation object gets a thread operation from work queue 12 (assuming one is available), decrements the depth of the work queue, and casts and returns the thread operation to the Work Queue State Controller object. Control is then returned to the Work Queue Stopped State object. If the thread operation returned from the Work Queue Implementation object is valid, a no-operation is returned to the work Queue State Controller object.

The Operation Main method of the Operation object is called to execute the no-operation thread operation. When the thread has completed the no-operation thread operation, the thread returns to get the state of the thread pool and dequeue another thread operation.

Figure 13:
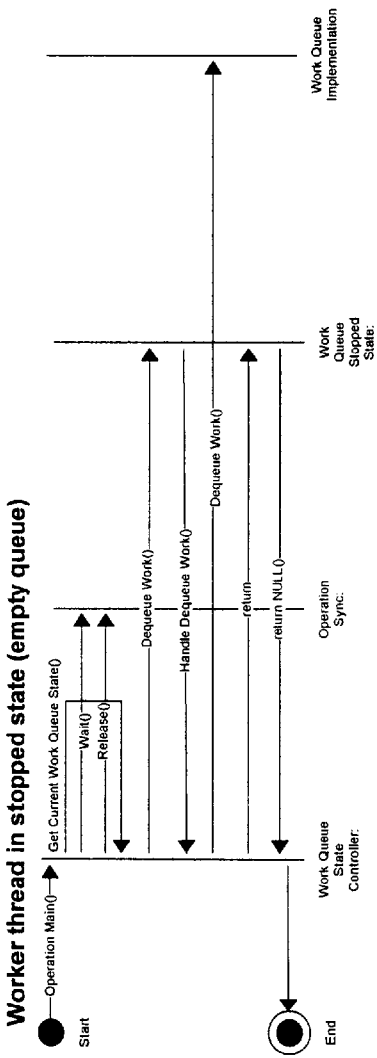
FIG. 13 is an object interaction diagram that illustrates execution of a thread when the thread pool is in a stopped state and the work queue is empty.
Figure 1:
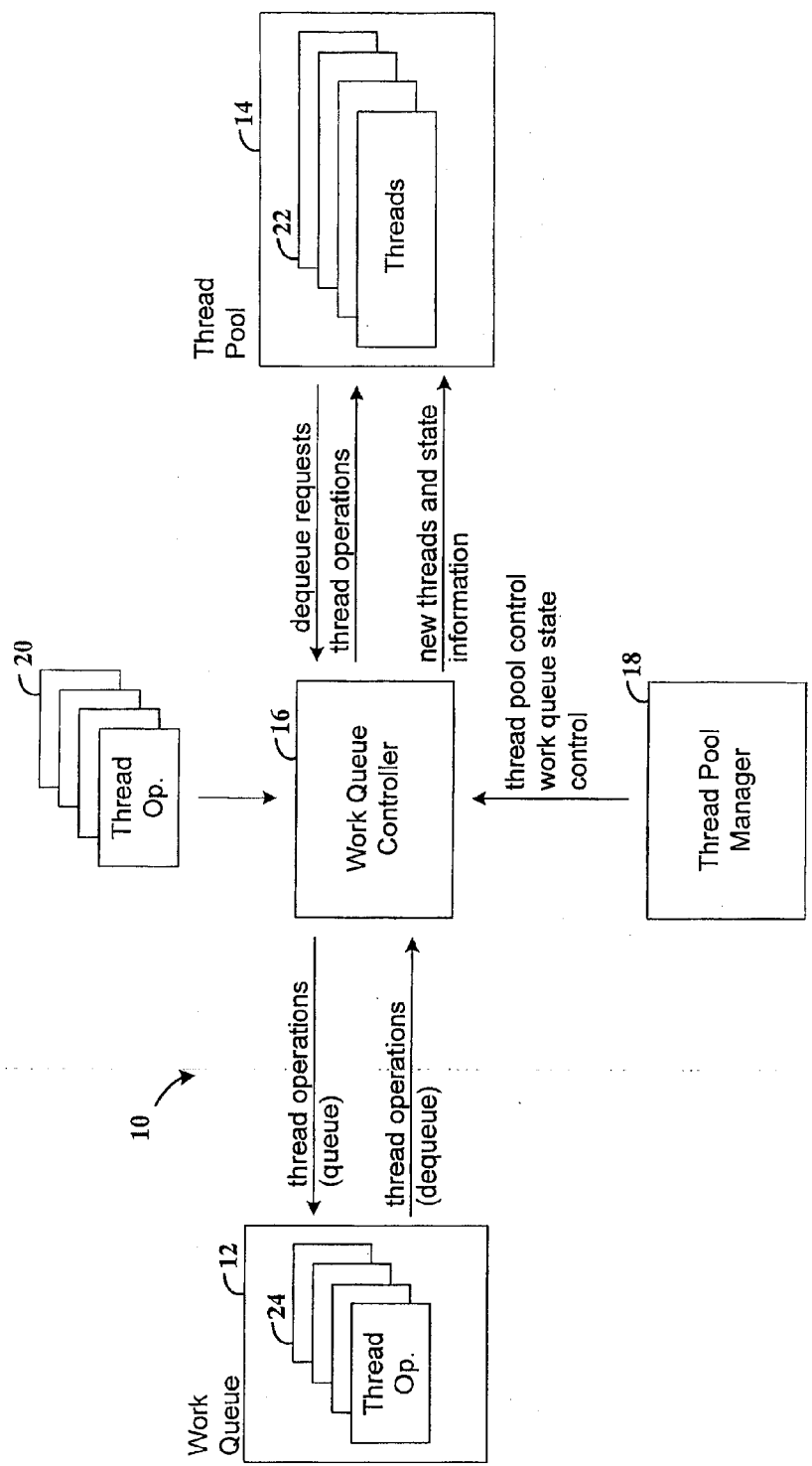

FIG. 13 is an object interaction diagram that illustrates execution of a thread when the thread pool is in a stopped state and the work queue is empty. The object interaction for an empty work queue 12 when thread pool 14 is in a stopped state is similar to the object interaction when the work queue is not empty. However, the difference is that the Work Queue implementation object returns NULL to the Work Queue State Controller object, which causes the busy thread count to be decremented and the thread is destroyed.

Accordingly, the present invention provides, among other aspects, a method for managing a pool of threads and a queue of work to be performed by the threads. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

We claim:

1. A computer-implemented method for managing a pool of threads for executing thread operations, comprising:

instantiating a thread pool having a plurality of threads;

instantiating a work queue having a program controllable state;

queuing thread operations to the work queue for execution by threads in the thread pool when the work queue is in a running state and when the work queue is in a suspended state;

denying queuing of thread operations to the work queue when the work queue is in a stopped state;

repeating by each thread steps of dequeueing a thread operation and executing the thread operation when the work queue is in the running state; and ceasing to dequeue thread operations when the work queue is in the suspended state.

2. The method of claim 1, wherein when the work queue is in a suspended state, further comprising:

each of the threads in the pool of threads continuing to submit requests to dequeue thread operations from the work queue; and returning no-operation thread operations to the threads in response to the dequeue requests.

3. The method of claim 1 wherein when the state of tie work queue is changed from running to stopped, further comprising performing the step of dequeueing unexecuted thread operations.

4. The method of claim 3, further comprising allowing thread operations in execution to complete.

5. The method of claim 3, wherein when the work queue is in a stopped state, further comprising:

each of the threads in the pool of threads continuing to submit requests to dequeue thread operations from the work queue; and returning no-operation thread operations to the threads in response to the dequeue requests.

6. The method of claim 1, further comprising:

starting one or more temporary threads with the thread pool; and removing the temporary threads from the thread pool when the work queue is changed to a stopped state.

7. A computer-implemented method for managing execution of thread operations, comprising:

instantiating a plurality of thread pools, each including an associated plurality of threads;

instantiating a plurality of work queues, each having a program controllable state and associated with one of the thread pools;

queuing thread operations to the work queues for execution by threads in the associated thread pools, wherein thread operations arc queueable to a work queue when the work queue is in a running state and when the work queue is in a suspended state;

denying queuing of thread operations to a work queue when the work queue is in a stopped state; and repeating by each thread in a thread pool steps of dequeueing a thread operation from the associated work queue and executing the thread operation when the work queue is in a running state; and ceasing to dequeue thread operations from a work queue when the work queue is in the suspended state.

8. The method of claim 7, further comprising:

starting one or more temporary threads with one or more of the thread pools; and removing the one or more temporary threads from a thread pool when the work queue associated with the thread pool is changed to a stopped state.

9. An apparatus for managing a pool of threads for executing thread operations, comprising:

means for instantiating a thread pool having a plurality of threads;

means for instantiating a work queue having a program controllable state;

means for queuing thread operations to the work queue for execution by threads in the thread pool when the work queue is in a running state and when the work queue is in a suspended state;

means for denying queuing of thread operations to the work queue when the work queue is in a stopped state;

means for dequeueing thread operations and executing the thread operations by the threads when the work queue is in the running state; and means for ceasing to dequeue thread operations when the work queue is in the suspended state.

10. A system for managing a pool of threads for executing thread operations, comprising:

a thread pool object having a plurality of thread objects;

a work queue object having a program controllable state;

a work queue controller coupled to the work queue object and to the thread pool object, the work queue controller configured and arranged to queue thread operations to the work queue object for execution when the work queue object is in a running state and when the work queue is in a suspended state and deny queuing of a thread operation to the work queue object when the work queue object is in a stopped state;

a thread pool manager coupled to the work queue controller, the thread pool manager configured and arranged to selectively change states of the work queue object;

wherein each of the thread objects is configured and arranged to dequeue thread operations and execute the thread operations, and the work queue controller is configured to cease dequeueing thread operations when the work queue is in the suspended state.

11. The system of claim 10, wherein the thread pool manager is configured and arranged to start one or more temporary thread objects with the thread pool object and remove the temporary thread objects from the thread pool object when the work queue object is changed to a stopped state.

* * * * *

UNITED STATES PATENT AND TRADEMARK OFFICE
CERTIFICATE OF CORRECTION

PATENT NO. : 6,687,729 B1
DATED : February 3, 2004
INVENTOR(S) : Sievert et al.

It is certified that error appears in the above-identified patent and that said Letters Patent is hereby corrected as shown below:

Drawings,
Formal drawings are attached to replace the informal drawings that were printed in patent.

Column 13,
Line 16, "tie" should read -- the --.

Signed and Sealed this

Tenth Day of August, 2004

JON W. DUDAS
*Acting Director of the United States Patent and Trademark Office*